United States Patent
Hopper et al.

(10) Patent No.: US 10,139,572 B2
(45) Date of Patent: Nov. 27, 2018

(54) DUPLEX FIBER OPTIC COMPONENTS SUITABLE FOR POLARITY REVERSAL

(71) Applicant: Leviton Manufacturing Co., Inc., Melville, NY (US)

(72) Inventors: Scott Richard Hopper, Snohomish, WA (US); Evan Gustafson, Seattle, WA (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 15/481,039

(22) Filed: Apr. 6, 2017

(65) Prior Publication Data

US 2017/0293090 A1 Oct. 12, 2017

Related U.S. Application Data

(60) Provisional application No. 62/321,145, filed on Apr. 11, 2016.

(51) Int. Cl.
*G02B 6/38* (2006.01)

(52) U.S. Cl.
CPC .......... *G02B 6/3871* (2013.01); *G02B 6/387* (2013.01); *G02B 6/3821* (2013.01);
(Continued)

(58) Field of Classification Search
CPC .. G02B 6/3871; G02B 6/3821; G02B 6/3878; G02B 6/3887; G02B 6/387; G02B 6/3885
See application file for complete search history.

(56) References Cited

U.S. PATENT DOCUMENTS

| 4,611,887 A | 9/1986 | Glover et al. |
| 5,123,071 A | 6/1992 | Mulholland et al. |

(Continued)

FOREIGN PATENT DOCUMENTS

| CN | 102749682 A | * 10/2012 |
| CN | 102749683 A | * 10/2012 |

(Continued)

OTHER PUBLICATIONS

International Search Report and Written Opinion dated Jan. 25, 2017, issued in related International Application No. PCT/US2016/055876, 17 pages.

(Continued)

*Primary Examiner* — Peter Radkowski
(74) *Attorney, Agent, or Firm* — Amin, Turocy & Watson, LLP

(57) ABSTRACT

Embodiments of the present disclosure provide techniques for a fiber optic connector assembly configured for polarity reversal in accordance with some embodiments. An assembly may include a housing to receive a fiber optic cable, at least one back post connected with the housing, a ferrule including at least an optical fiber of the fiber optic cable, insertable into the back post, and a connector component comprising a front housing. The front housing may hold at least a portion of the ferrule and detachably couple with the back post. The back post may include a retaining element to provide rotatable coupling of the front housing relative to the ferrule, the back post and the housing. Other embodiments may be described and/or claimed.

20 Claims, 24 Drawing Sheets

(52) U.S. Cl.
CPC ......... *G02B 6/3878* (2013.01); *G02B 6/3885* (2013.01); *G02B 6/3887* (2013.01)

(56) References Cited

U.S. PATENT DOCUMENTS

| | | | |
|---|---|---|---|
| 5,293,581 A | 3/1994 | DiMarco | |
| 5,528,712 A * | 6/1996 | Belenkiy | G02B 6/3879 385/78 |
| 5,579,425 A | 11/1996 | Lampert et al. | |
| 5,727,101 A * | 3/1998 | Giebel | G02B 6/3834 385/59 |
| 6,250,817 B1 * | 6/2001 | Lampert | G02B 6/3879 385/137 |
| 6,357,934 B1 * | 3/2002 | Driscoll | G02B 6/3869 385/59 |
| 6,409,392 B1 * | 6/2002 | Lampert | G02B 6/3879 385/56 |
| 6,435,732 B1 | 8/2002 | Asao et al. | |
| 6,511,230 B1 * | 1/2003 | Connelly | G02B 6/3869 385/58 |
| 6,672,898 B2 | 1/2004 | Kahle et al. | |
| 6,744,939 B2 * | 6/2004 | Lampert | G02B 6/3812 385/11 |
| 6,918,704 B2 | 7/2005 | Marrs et al. | |
| 7,178,990 B2 | 2/2007 | Caveney et al. | |
| 7,189,008 B2 | 3/2007 | Dye | |
| 7,712,970 B1 | 5/2010 | Lee | |
| 8,152,385 B2 * | 4/2012 | de Jong | G02B 6/3879 385/53 |
| 8,636,424 B2 * | 1/2014 | Kuffel | G02B 6/383 385/78 |
| 8,678,669 B2 * | 3/2014 | Lee | G02B 6/3879 257/E23.177 |
| 8,727,638 B2 * | 5/2014 | Lee | G02B 6/3879 385/139 |
| 8,764,308 B2 | 7/2014 | Irwin | |
| 8,801,301 B2 | 8/2014 | Bradley et al. | |
| 9,063,303 B2 * | 6/2015 | Irwin | G02B 6/3879 |
| 9,207,410 B2 * | 12/2015 | Lee | G02B 6/3897 |
| 9,316,803 B2 * | 4/2016 | Manes | G02B 6/4472 |
| 9,557,495 B2 | 1/2017 | Raven et al. | |
| 9,625,658 B1 * | 4/2017 | Lin | G02B 6/387 |
| 2007/0047877 A1 | 3/2007 | Pepe | |
| 2010/0220961 A1 * | 9/2010 | de Jong | G02B 6/3879 385/77 |
| 2012/0099822 A1 * | 4/2012 | Kuffel | G02B 6/383 385/78 |
| 2012/0308183 A1 * | 12/2012 | Irwin | G02B 6/3879 385/56 |
| 2014/0050443 A1 * | 2/2014 | Lee | G02B 6/3879 385/77 |
| 2014/0169727 A1 * | 6/2014 | Veatch | G02B 6/3831 385/11 |
| 2014/0270636 A1 * | 9/2014 | Manes | G02B 6/4472 385/24 |
| 2015/0277059 A1 * | 10/2015 | Raven | G02B 6/3879 385/78 |

FOREIGN PATENT DOCUMENTS

| | | | | |
|---|---|---|---|---|
| CN | 103091793 A | * | 5/2013 | ......... G02B 6/3879 |
| CN | 102749683 B | * | 11/2014 | |
| CN | 102749682 B | * | 5/2015 | |
| TW | M474924 | | 3/2014 | |
| WO | 2010099141 A1 | | 9/2010 | |
| WO | WO 2010099141 A1 | * | 9/2010 | ......... G02B 6/3879 |
| WO | 2015103783 A1 | | 7/2015 | |
| WO | WO 2015103783 A1 | * | 7/2015 | ......... G02B 6/3825 |

OTHER PUBLICATIONS

International Search Report and Written Opinion dated Jun. 15, 2017, issued in related International Application No. PCT/US2017/020150, 11 pages.
International Search Report for PCT Application No. PCT/US2017/026486, dated Jul. 26, 2017, 3 pages.
Written Opinion of the International Searching Authority for PCT Application No. PCT/US2017/026486, dated Jul. 26, 2017, 5 pages.
Office Action dated Jun. 30, 2017 for U.S. Appl. No. 15/260,305, 20 pages.
Office Action dated Dec. 29, 2017 for U.S. Appl. No. 15/381,071, 31 pages.

* cited by examiner

DUPLEX FIBER OPTIC COMPONENTS SUITABLE FOR POLARITY REVERSAL

CROSS-REFERENCE TO RELATED APPLICATION

The present application claims priority to U.S. Provisional Patent Application No. 62/321,145, filed Apr. 11, 2016, and titled "DUPLEX FIBER OPTIC COMPONENTS SUITABLE FOR POLARITY REVERSAL," the entire disclosure of which is hereby incorporated by reference.

FIELD

Embodiments of the present disclosure generally relate to the field of optical communications, and more particularly, to fiber optic connectors with components suitable for polarity reversal.

BACKGROUND

Modern optical devices and optical communications systems widely use fiber optic connectors and cables. A typical fiber optic cable includes one or more optical fibers contained within a protective jacket.

A typical optical fiber includes a glass or plastic core surrounded by a cladding layer having a lower refractive index as compared to the refractive index of the core. The cladding causes a light signal to be confined to the core by total internal reflection at the boundary between the two components. The optical fiber of a typical fiber optic connector is retained within a ferrule assembly supported by a ferrule sleeve at a distal end of a connector housing. A spring may be used to bias the ferrule assembly in a distal direction relative to the connector housing. The ferrule assembly typically supports an end portion of at least one optical fiber but, in the case of a multi-fiber ferrule, supports the ends of multiple optical fibers.

The ferrule has a distal end face at which a polished end of the optical fiber is located. When two optical fibers are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal may be transmitted from optical fiber to optical fiber through the aligned end faces of the optical fibers.

Fiber optic communication systems employ a network of fiber optic connectors and cables to transmit large volumes of data and voice signals over relatively long distances. Fiber optic connectors allow optical fibers to be quickly connected and disconnected without requiring the splicing together of separate optical fibers. Fiber optic connectors can be used to optically interconnect two lengths of optical fiber as well as interconnecting lengths of optical fiber to passive and active equipment.

The capabilities of optical fiber, optical cable and fiber optic hardware including fiber optic connectors continuously improve through research and innovation to meet the demands of increasing numbers of users, such as increasing the bandwidth and the speed of signal transmission and the high density of connectivity. Each piece of equipment within the data center is interconnected to other equipment or to different components within the same cabinet using jumper, or patch, cables. Jumper cable assemblies typically comprise single fiber connectors and cables, i.e., simplex cable assemblies, usually arranged into sets of two, one receive and one transmit, i.e., duplex cable assemblies.

One method of duplexing simplex cable assemblies is to use a clip to couple two fiber optic connectors together. Another method of duplexing simplex cable assemblies is use of a single "unibody," or "uniboot," housing having just one cable input (containing two separate optical fibers) at one housing end and two separate fiber optic connector front connector housing elements at the opposing housing end. Increasing connectivity density in data centers, as well as the ability to efficiently manage connectivity challenges may be addressed by providing flexibility in signal transmit and receive configuration, to mitigate the ever increasing challenges of the modern data center.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Some embodiments of the present disclosure include techniques and configurations for a fiber optic connector assembly that allows for the reversal of the polarity of the transmit and receive optical fibers in a duplex connector configuration in accordance with some embodiments.

Figure 1:
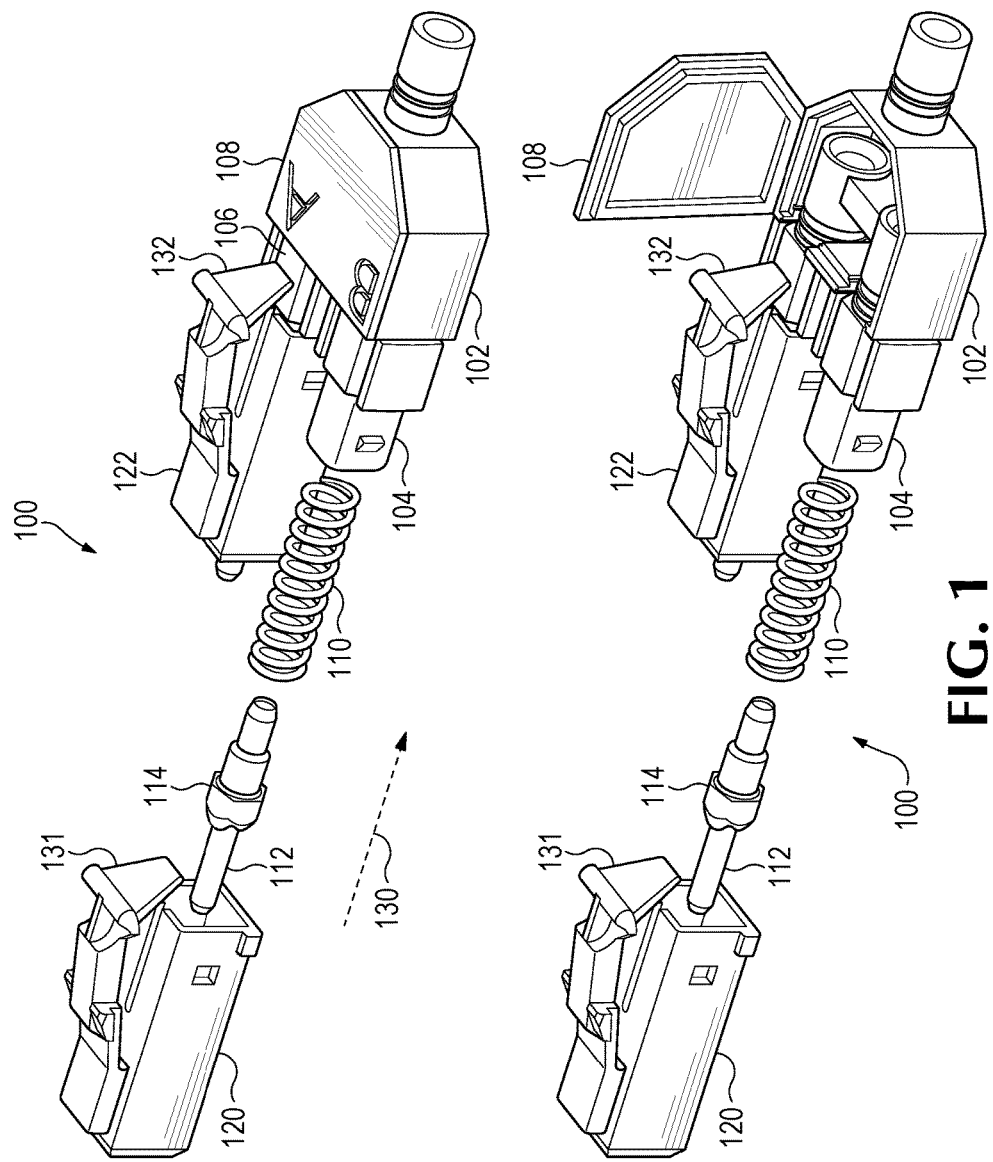
FIG. 1 illustrates exploded perspective views of an example fiber optic connector assembly configured for polarity reversal in accordance with some embodiments.

FIG. 1 illustrates exploded perspective views of an example fiber optic connector assembly 100 configured for polarity reversal in accordance with some embodiments. As shown, the assembly 100 may include a housing 102 to accommodate the duplexed fiber optical connector assemblies, with connector housing back posts 104, 106 disposed within, and extending from, the housing 102. In other embodiments, housing 102 may be constructed to structurally and integrally include back posts 104, 106 extending from the distal face of housing 102. The back posts 104, 106 may have a rounded, rectangular outer periphery and include substantially round inner apertures (see, e.g., 306 in FIG. 3) to allow at least some portion of the fiber optic connector assembly to extend through the housing 102.

In embodiments, the housing 102 may comprise a unibody housing, e.g., the housing 102 may be manufactured as a single-piece component having, for instance, a single fiber optic cable input at one end and duplexed fiber optic connector portions at an opposing end. The housing 102 may also be coupled with a housing lid 108 that may be hinged or otherwise movably attached to the housing 102 to cover the housing 102. The assembly 100 may further include a spring 110 and a ferrule 112 with a sleeve 114 to hold the ferrule 112. The ferrule 112 may include a fiber of a fiber optic cable.

The assembly 100 may further include connector portions to enable optical connections between the assembly 100 and another optical device (e.g., another assembly, not shown). The connector portions may comprise respective front housings 120 and 122 to house at least portions of respective ferrules 112, ferrule sleeves 114 and springs 110. In the example illustration of FIG. 1, the front housings 120, 122 correspond to respective connectors "B" (left side) and "A" (right side) as indicated on the housing 102. As shown, the front housings 120, 122 may include respective latches 131, 132 configured to provide reversibly latchable mechanical fixation between the front housings 120, 122 and another optical device (e.g., an adapter (not shown)) in order to keep the end face of ferrule 112 in a desired position for optimal optical connection with a mating connector.

To assemble the assembly 100, the ferrule 112 may be inserted into connector housing 120, 122, then the spring 110 is inserted onto the ferrule sleeve 114, then back post 104, 106 may be forced inside connector housing 120, 122 and held in place by coupling means 304, 404 (see FIGS. 3-5) between back post 104, 106 and connector housing 120, 122. The spring 110 may be loaded by applying a frontal force to the front housing and pushing the front housing 120 with the ferrule 112 toward (and into) the back post 104, as indicated by arrow 130. In response to application of the force indicated by arrow 130, the ferrule 112 may be at least partially inserted into the back post 104.

In some embodiments, the assembly 100 may be configured to allow independent rotation of the front housings 120 and 122 relative to their respective internal connector portions, e.g., ferrules 112, ferrule sleeves 114 and springs 110 and respective back posts (e.g., 104), wherein the rest of the assembly 100 may not be movable. For example, the ferrule 112, ferrule sleeve 114, spring 110 and the back post 104 may remain unmoved in response to rotation of the front housing 120. The example embodiments of the assembly 100 that provide independent rotation of the front housings 120 and 122 are described below.

Figure 2:
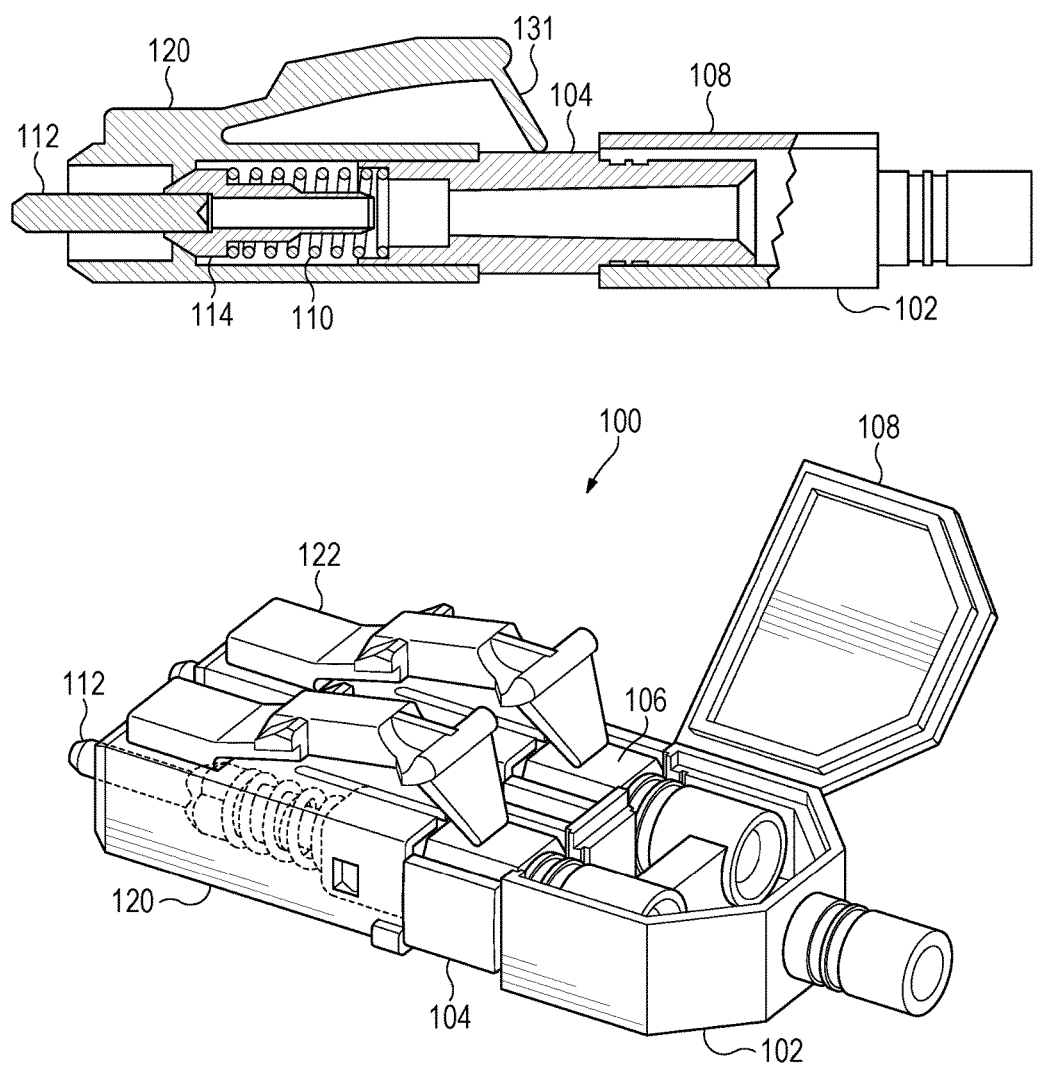
FIG. 2 illustrates front and side views of the example assembly in assembled state, in accordance with some embodiments.

FIG. 2 illustrates front and side views of the example assembly 100 in assembled state, in accordance with some embodiments. As shown, the ferrule 112 may extend from the front housing 120 to mate with another connector assembly (e.g., another fiber optic connector within an adapter (not shown)).

Figure 3:
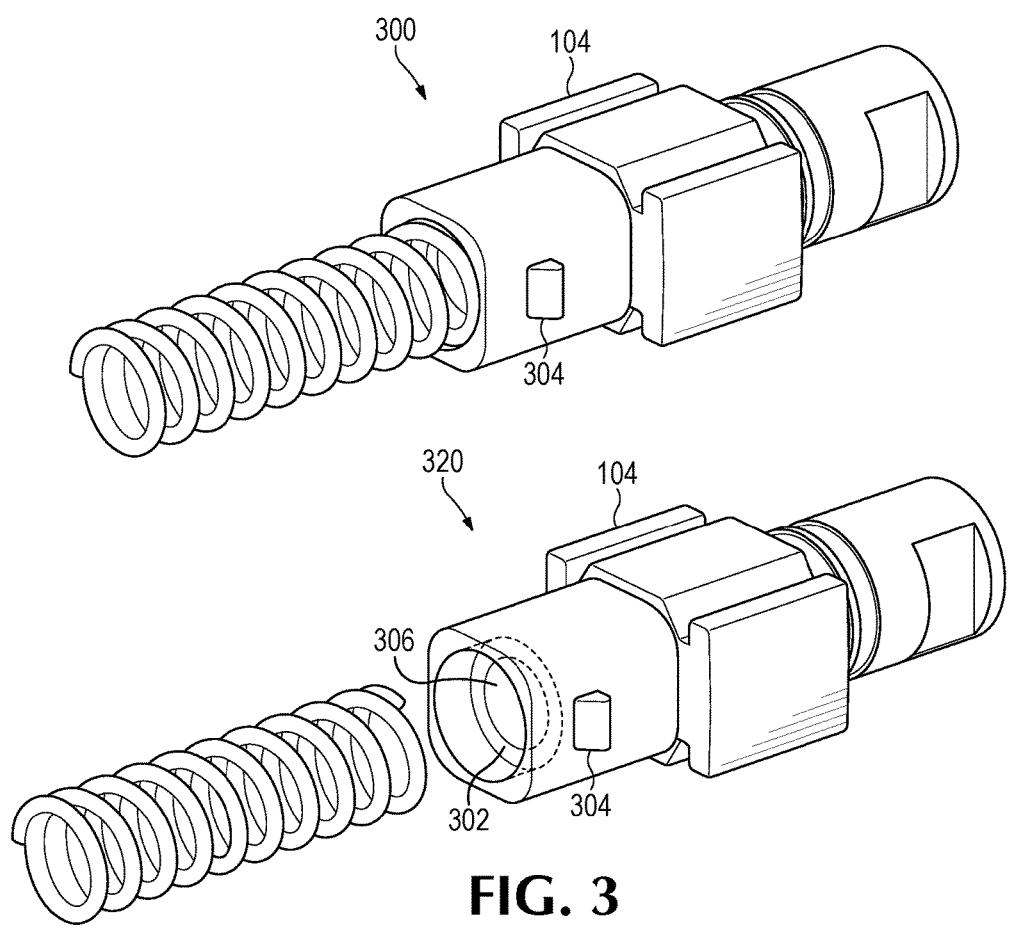
FIG. 3 illustrates perspective views of some components of the example assembly, in accordance with some embodiments.

FIG. 3 illustrates perspective views of some components of the example assembly 100, in accordance with some embodiments. More specifically, first view 300 of FIG. 3 illustrates the spring 110 insertable within inner aperture 306 of the back post 104. Second view 320 of FIG. 3 illustrates the spring 110 and the back post 104 in a disassembled state thereby revealing the flat shelf surface 302 inside the post of the back post 104 against which the spring 110 abuts when inserted within the inner aperture 306 of the back post 104. The back post 104 may include a retaining element, such as an ear or a lug 304, which is matable with a portion of the front housing 120 (see, e.g., matable window 404 in FIG. 4) to affix the front housing 120 to the back post 104 as described in greater detail below.

Figure 4:
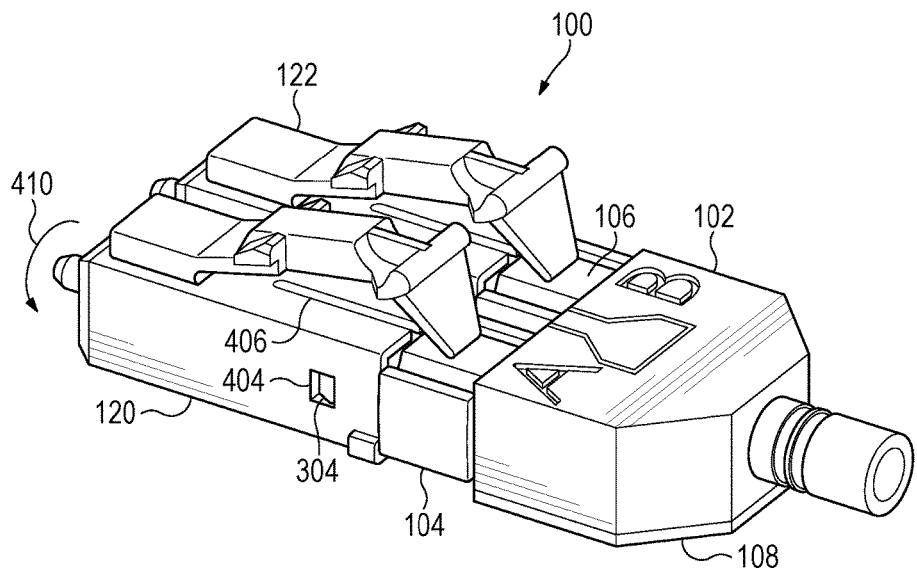
FIG. 4 illustrates a perspective view of the example assembly prior to front housing rotation, in accordance with some embodiments.

FIG. 4 illustrates a perspective view of the example assembly 100 prior to front housing rotation, in accordance with some embodiments. As noted in reference to FIG. 3, the lug 304 may be mated with, and partially extend out of, a corresponding window 404 of the front housing 120, in order to keep the front housing 120 fixably attached to the back post 104. As shown, the front housing 120 may include one or more slits 406 at least partially extending into sides of the body of the front housing 120. In some embodiments, the front housing 120 may include two or four slits 406, disposed on opposite sides or each side of the body of the front housing 120. The slits 406 may provide for desired flexibility of the body of the front housing 120 during rotation, in order for the window 404 to clear the lug 304 in response to either the initial insertion of the back post 104, 106 into the front connector housing 120, 122, or a rotational force 410 that may be applied to the front housing 120.

Figure 5:
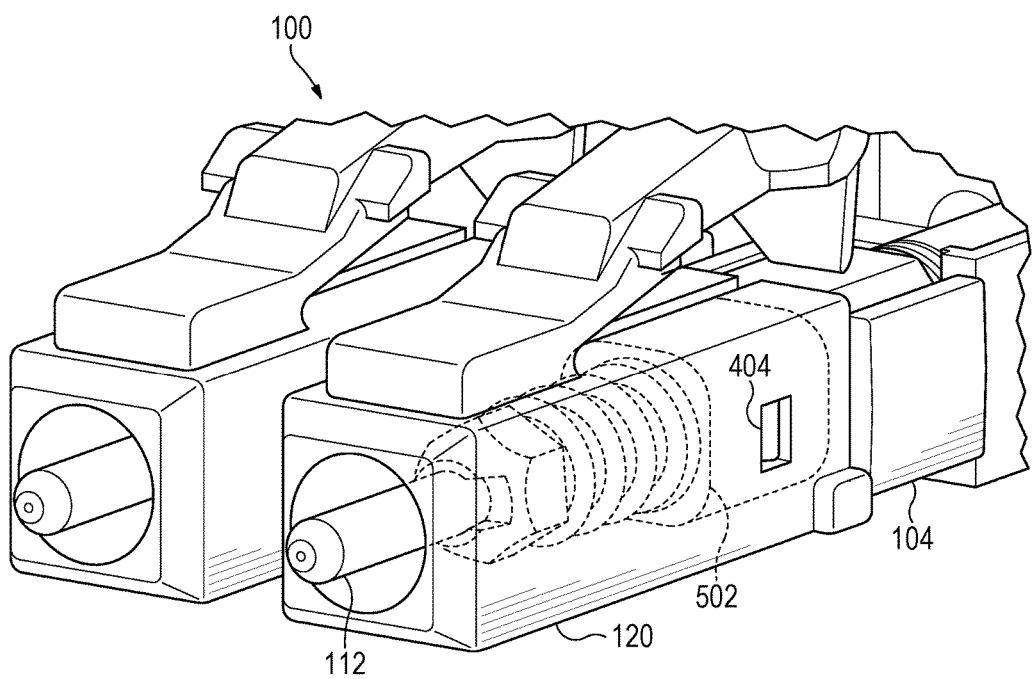
FIG. 5 illustrates a perspective front view of the example assembly with some components shown in partially transparent view, in accordance with some embodiments.

In embodiments, the assembly 100 may include an additional feature to allow rotation of the front housing 120 without damaging front connector housing 120, 122 or the slits 406. FIG. 5 illustrates a perspective front view of the example assembly 100 with some components shown in partially transparent view. As shown, the back post 104 may define, at its distal end, a substantially cam-shaped profile 502 configured to allow rotation of the front housing 120 without plastically deforming slit 406 (FIG. 4) in response to application of a rotational force. When a rotational force is applied to the front housing 120, the body of the front housing 120 may flex due to the slits 406, and the window 404 may clear the lug 304 of the back post 104.

Accordingly, the assembly 100 may allow for independent rotation of front housings 120 and 122 about respective back post components 104, 106, while no other components of the assembly 100 may move.

Figure 6:
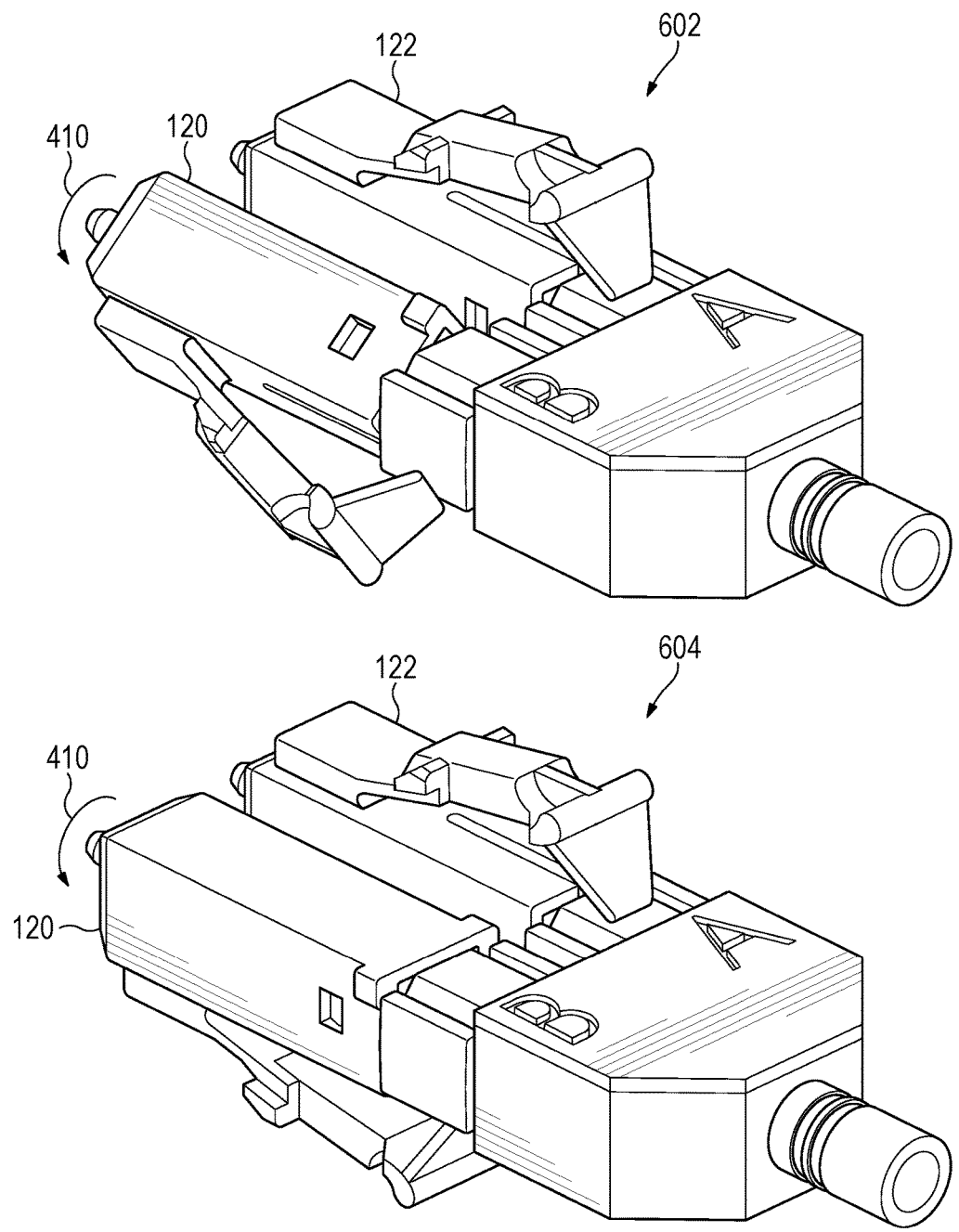
FIG. 6 illustrates perspective views of the example assembly, during rotation of the front housing, in accordance with some embodiments.

FIG. 6 illustrates perspective views of the example assembly 100, during rotation of the front housing 120. More specifically, first view 602 of FIG. 6 illustrates the assembly 100 with the front housing 120 partially rotated relative to the back post 104 in response to application of the rotational force 410. Second view 604 of FIG. 6 illustrates the assembly 100 with the front housing 120 rotated relative to the back post 104 to an angle 180 degrees relative to its original position. In other words, the front housing 120, rotated as shown, may assume a position that is reversed relative to the original position of the front housing 120 in the assembly 100 (see, e.g., FIG. 4).

Figure 7:
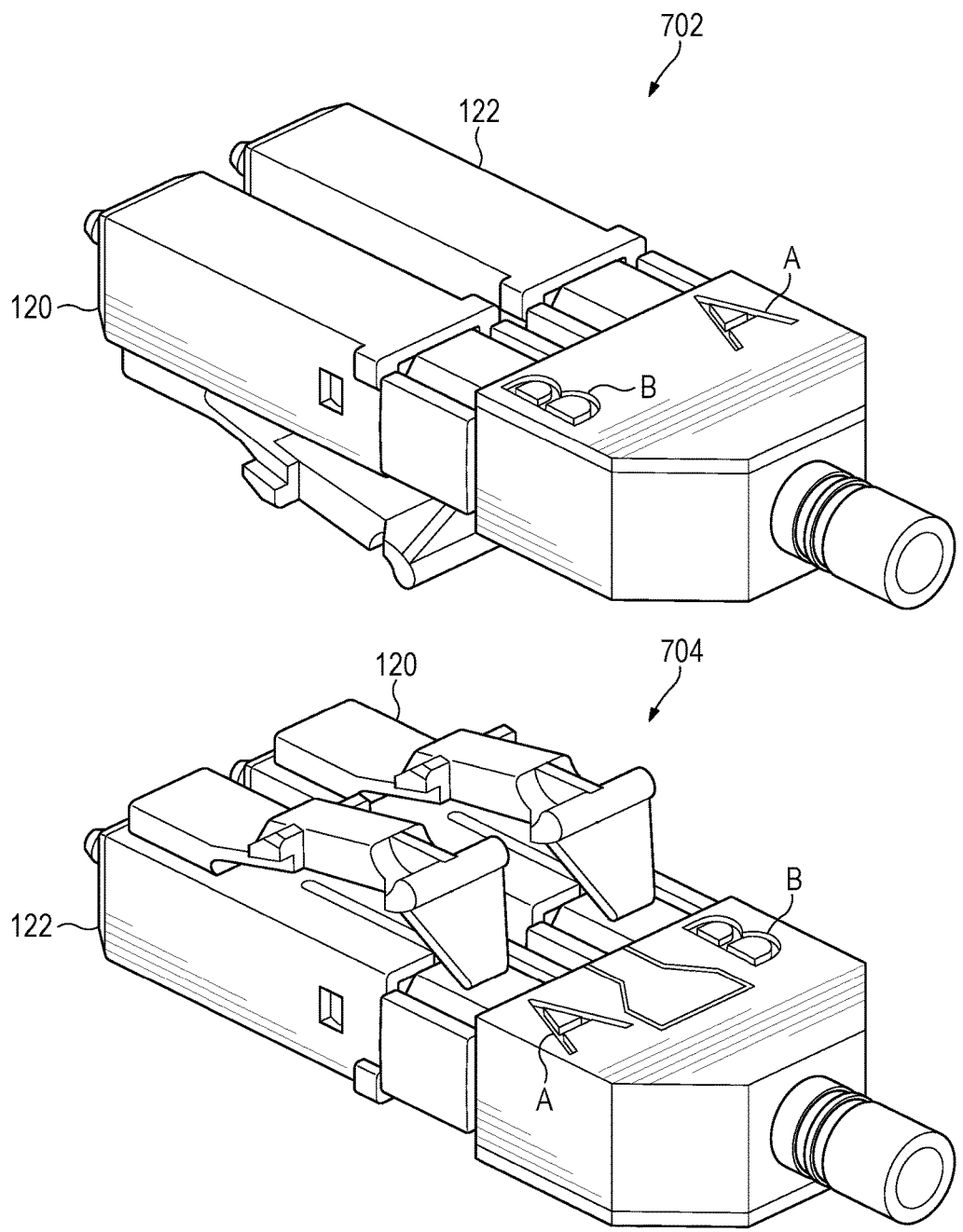
FIG. 7 illustrates perspective views of the example assembly, in accordance with some embodiments.

FIG. 7 illustrates perspective views of the example assembly 100, in accordance with some embodiments. View 702 illustrates a reversed position of front housings 120 and 122 with the housing in its original position. View 704 illustrates a state in which front housings 120 and 122 have been moved to their reversed positions relative to their original positions with the entire assembly rotated. As shown, the reversed positions of the front housings 120 and 122 in the assembly 100 effectively enable polarity reversal of the transmit and receive optical fibers for the assembly 100, without the necessity of having to disassemble any components of assembly 100. For example, as shown in the second view 704 of FIG. 7, following 180° rotation of each of front housings 120 ("B") and 122 ("A"), the front housing 120 ("B") is now on the right side of housing 102 and front housing 122 ("A") is now on the left side of housing 102, relative to front housing 120 ("B"). In the example embodiments described above, the retention components for the front housing 120 on the assembly 100 comprise the window 404 provided on the body of the front housing 120 and corresponding lug 304 of the back post 104. As described, these components, in combination with slits 406, allow for independent rotation of the front housings 120 and 122 around their respective back posts 104, 106. However, different other embodiments of such retention components may be contemplated, as described below.

Figure 8:
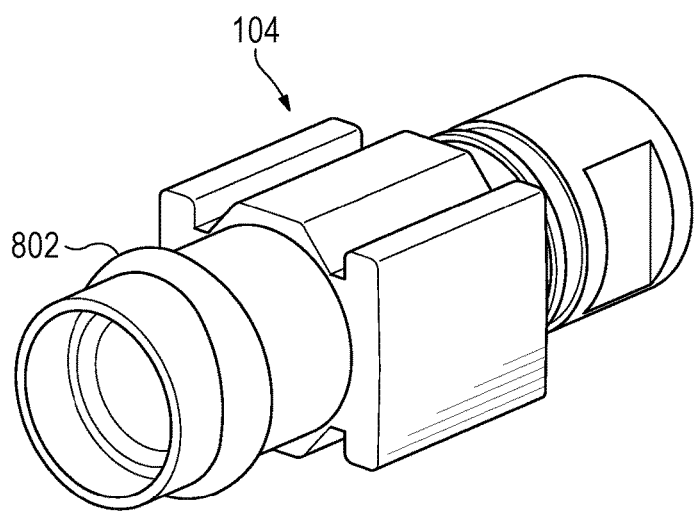
FIG. 8 illustrates a perspective view of an example back post of the example assembly, in accordance with some embodiments.

FIG. 8 illustrates a perspective view of a back post 104 of the example assembly 100. As shown, the back post 104 may include an annular ring 802 disposed about a frontwardly extending, annular portion of the back post 104 and configured to provide retention and rotation capabilities for a corresponding annular coupling member within the rearward portion of the front housing 120. The annular ring 802 may comprise different shapes, for example, may have different thicknesses around the body of the ring, as may be seen in FIG. 8.

Figure 9:
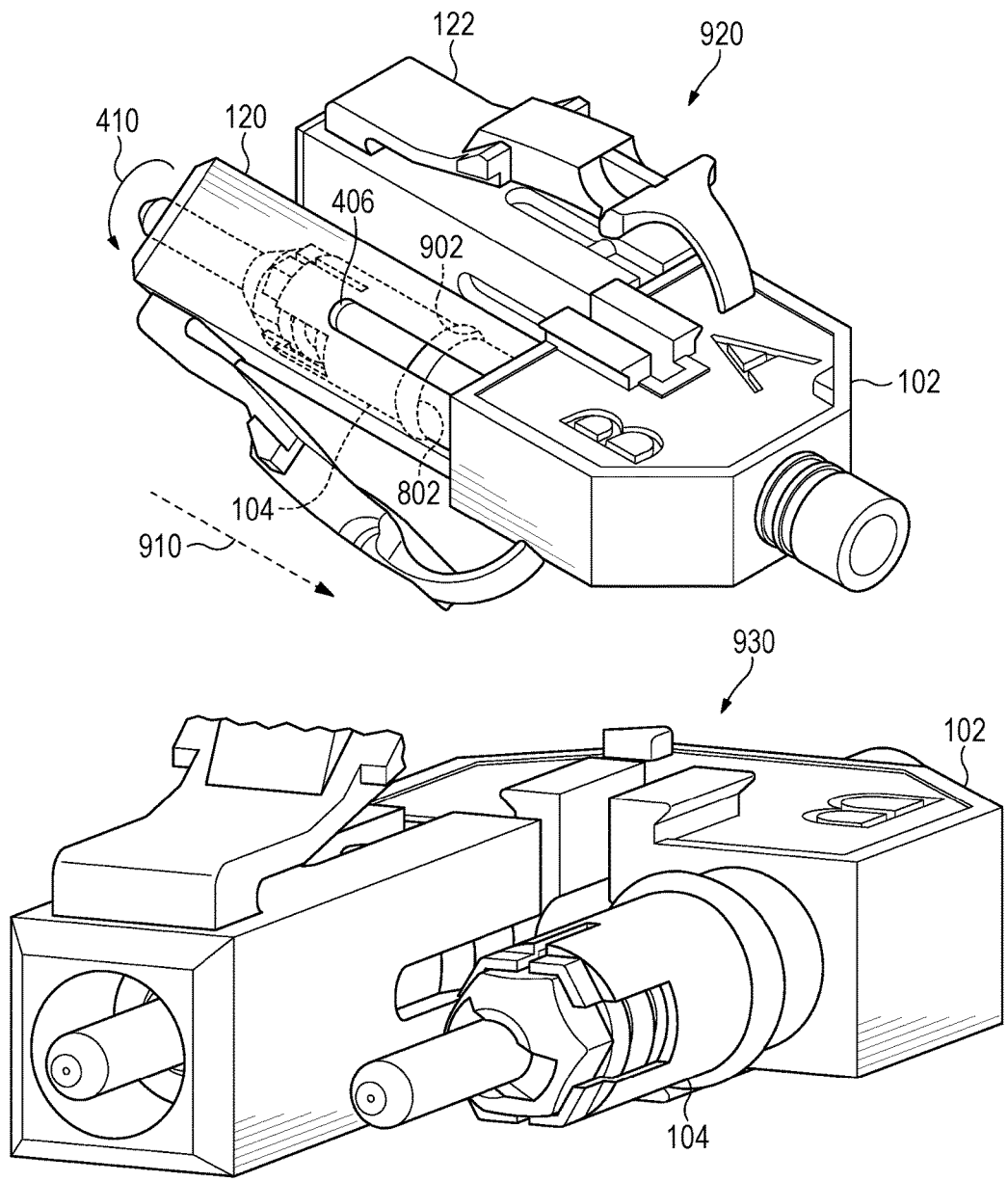
FIG. 9 illustrates perspective views of the example assembly 100, in accordance with some embodiments.

FIG. 9 illustrates perspective views of the example assembly 100, in accordance with some embodiments. View 920 illustrates the assembly 100 with the front housing 120 partially rotated about the back post 104. View 930 illustrates the assembly 100 showing the back post 104 attached to the housing 102. It should be understood that the back post 104 may be structurally integral to, or separately structured from, housing 102. The annular ring 802 defined on the outer, annular surface of back post 104 may be seen through the transparent front housing 120 and slit 406 therein.

The inner profile of the front housing 120 may include annular groove 902 that may be coupled with the annular ring 802 to secure front housing 120 to back post 104. For example, to assemble the assembly 100, the front housing 120 may be pushed on the back post 104, as indicated by the arrow 910, until the annular ring 802 receives the annular groove 902. The front housing 120 may thus be affixed on the back post 104. In response to application of rotational force 410, the front housing 120 may freely rotate about the annular ring 802 with its annular groove 902. In some embodiments, engagement of annual ring 802 with annual groove 902 may replace the engagement means of lug 304 and window 404 (see, e.g., FIG. 4).

In some embodiments, the rotation of the front housing 120 about the back post 104 may cause undesired rotation of the ferrule 112, due, for example, to an incidental frictional force between the conical front surface of sleeve 114 of the ferrule 112 and the inner, corresponding concave profile of the rearward inner surface of the front housing 120 as may best be seen in FIGS. 2, 5 through transparent front connector housing 120. The example embodiments described below provide solutions that may prevent undesired rotation of the ferrule 112, ferrule sleeve 114 and spring 110 along with the front housing 120.

FIGS. 9A-E illustrate different views of the example assembly of FIG. 9 with the back post including a step feature with lug provided on a back post, in accordance with some embodiments. The step feature with lug may be applied to a unibody housing embodiment as shown. For purposes of illustration, in FIGS. 9A-E the step feature with lug is indicated by the numeral 940, the step feature is indicated by the numeral 942, and the lug is indicated by the numeral 944.

Figure 9A:
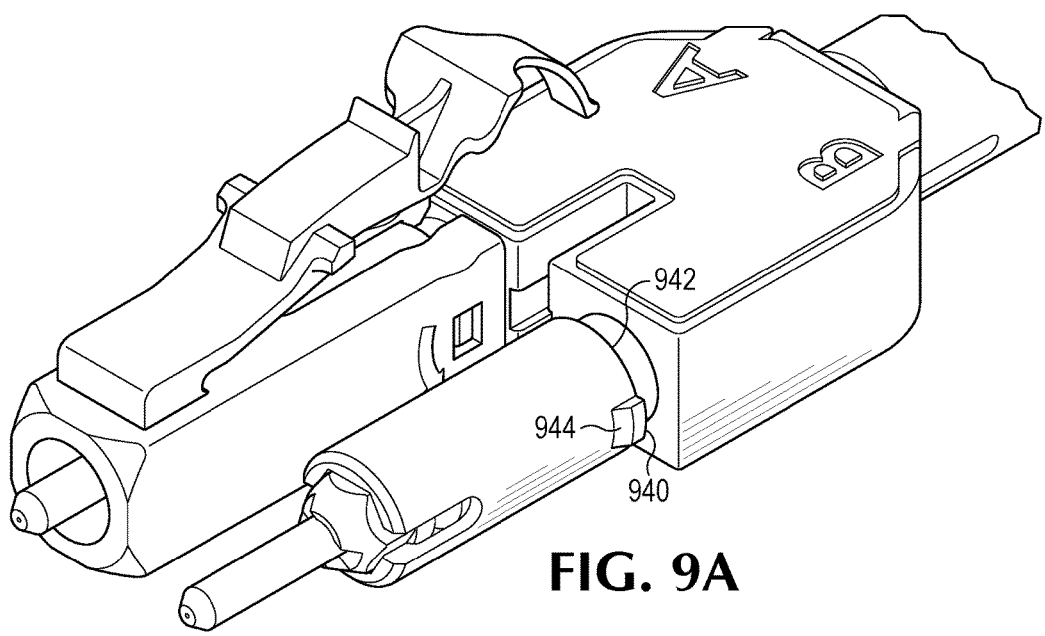
FIGS. 9A-E illustrate different views of the example assembly of FIG. 9 with the back post including a step feature with lug provided on a back post, in accordance with some embodiments.
Figure 9B:
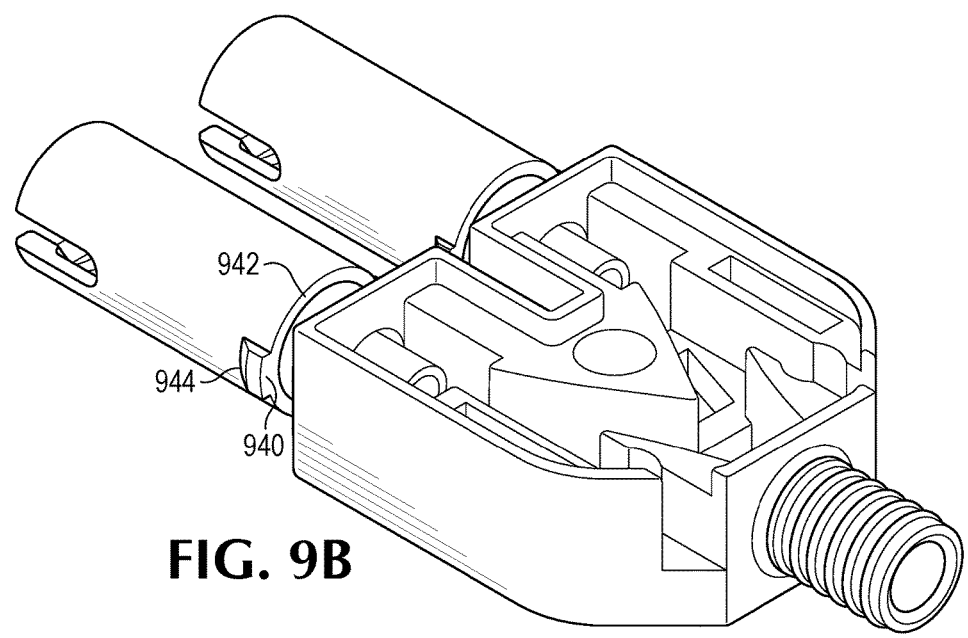
Figure 9C:
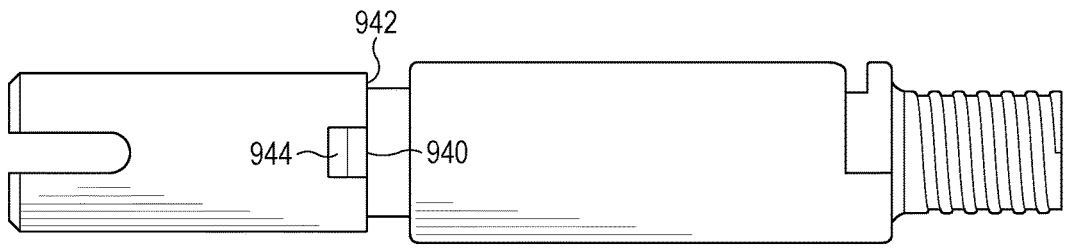
Figure 9D:
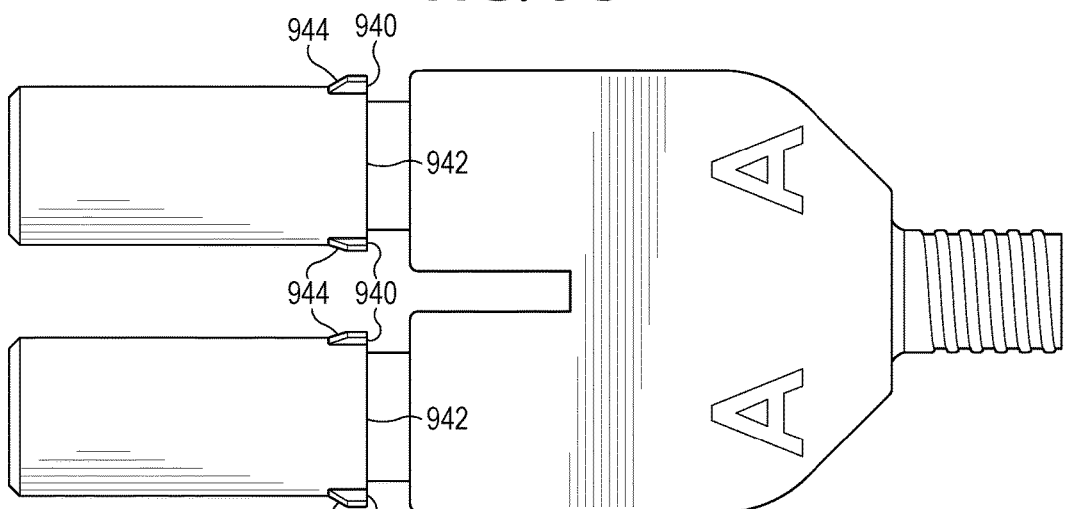
Figure 9E:
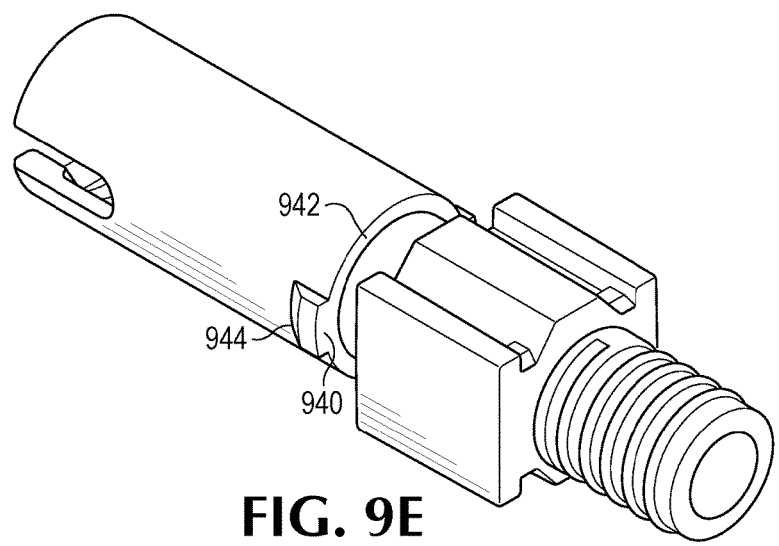

FIGS. 9A-B illustrate perspective views of the example assembly having a step feature with lug 940, FIG. 9C illustrates a side view of the example assembly with the step feature with lug 940, FIG. 9D illustrates a bottom view of the example assembly with the step feature with lug 940, and FIG. 9E illustrates a view of the back post of the example assembly with the step feature with lug 940.

The step feature with lug shown in FIGS. 9A-9E may accomplish the same function as the annular ring feature described above. The feature may provide the main retention interface between the front housing and back post, while allowing the front housing to rotate. The "lug" addition to the "step" may create a small amount of resistance to rotation and may locate the front housing at 0, 90, and 180 degrees when rotating about the back post.

Figure 10:
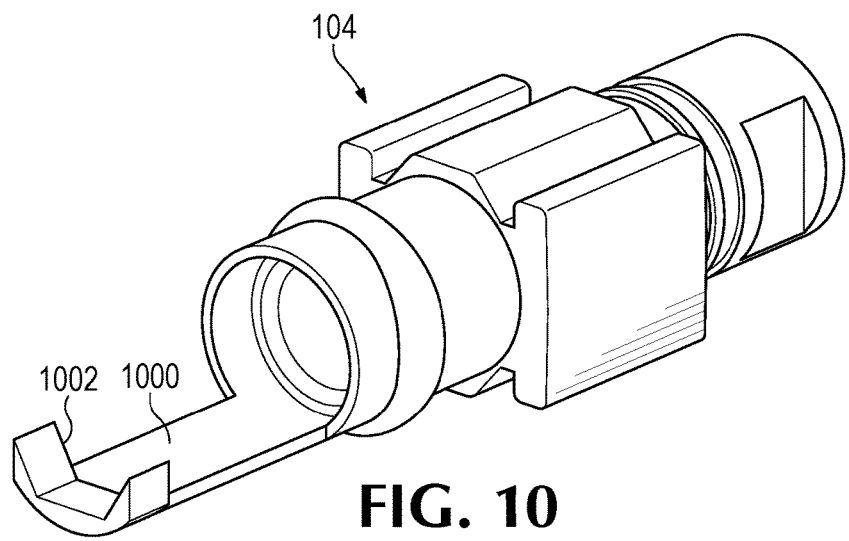
FIG. 10 illustrates a perspective view of another example back post of the example assembly, wherein the back post includes an extension, in accordance with some embodiments.

FIG. 10 illustrates a perspective view of another example of the back post 104 of the example assembly 100, wherein the back post 104 includes an extension 1000, in accordance with some embodiments. As shown, the extension 1000 may comprise a holder in a shape of a cradle 1002 disposed at the end of the extension 1000.

Figure 11:
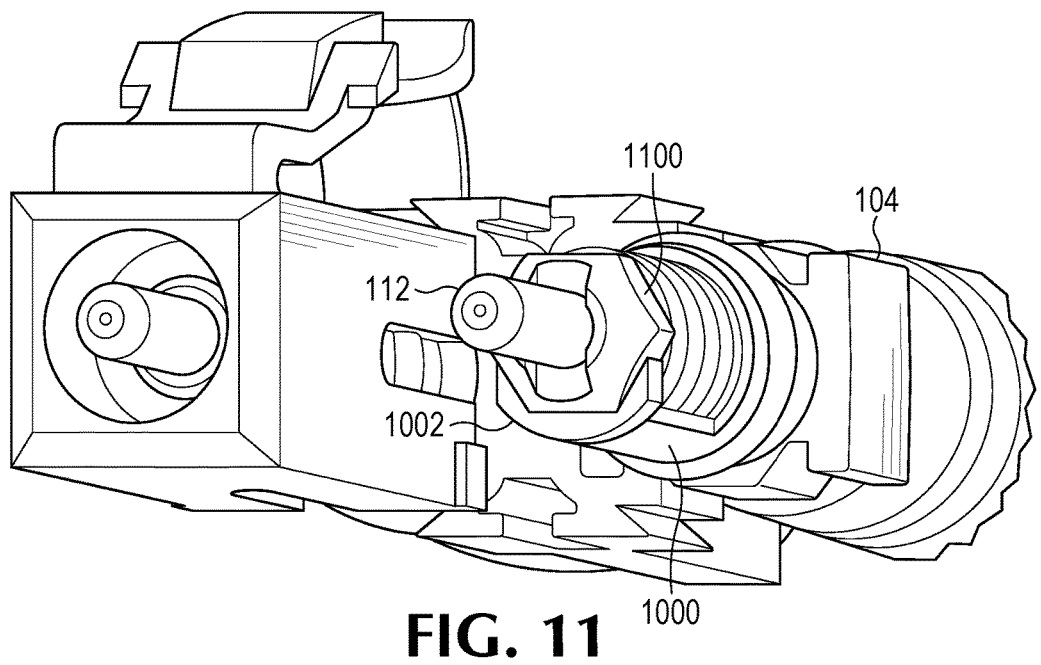
FIG. 11 illustrates a perspective view of the example assembly with the back post of FIG. 10, in accordance with some embodiments.

FIG. 11 illustrates a perspective view of the example assembly 100 with the back post 104 of FIG. 10, in accordance with some embodiments. As shown, the extension 1000 is configured as a keying element to interface with, for example, at least some portion of a key comprising a hexagonal shaped front face 1100 of the ferrule sleeve 114 to prevent rotation of the ferrule 112, and spring 110 of the assembly 100.

Figure 12:
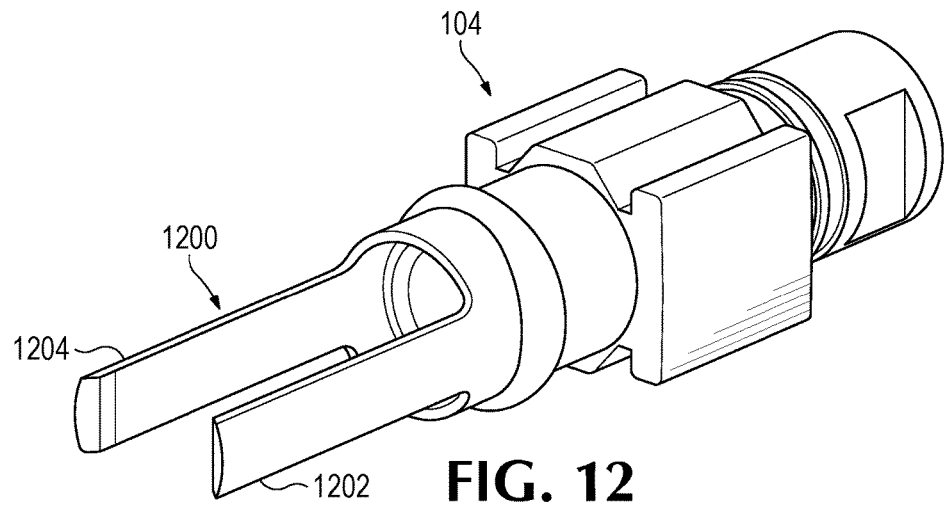
FIG. 12 illustrates a perspective view of another example of a back post of the example assembly, with an extension, in accordance with some embodiments.

FIG. 12 illustrates a perspective view of another example of a back post 104 of the assembly 100, wherein the back post 104 includes an extension 1200, in accordance with some embodiments. As shown, the extension 1200 is comprised of side hooks 1202, 1204.

Figure 13:
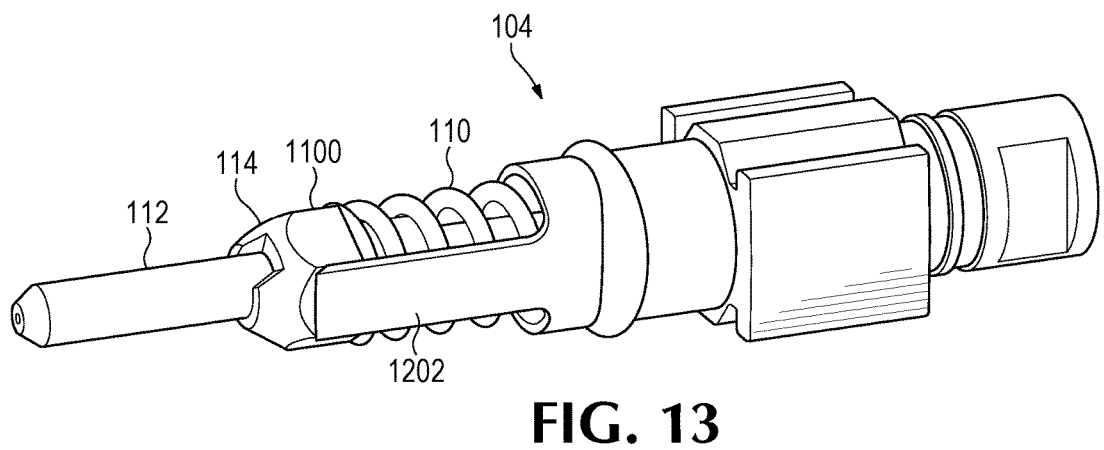
FIG. 13 illustrates a perspective view of a partial assembly with the back post of FIG. 12, in accordance with some embodiments.

FIG. 13 illustrates a perspective view of a partial assembly with the back post of FIG. 12, in accordance with some embodiments. The extension 1200 may be configured as a keying element to interface with, for example, at least some portion of the hexagonal shaped front face 1100 of ferrule sleeve 114 (FIG. 11) to prevent the rotation of the ferrule 112, ferrule sleeve 114 and spring 110 of the assembly 100.

Figure 14:
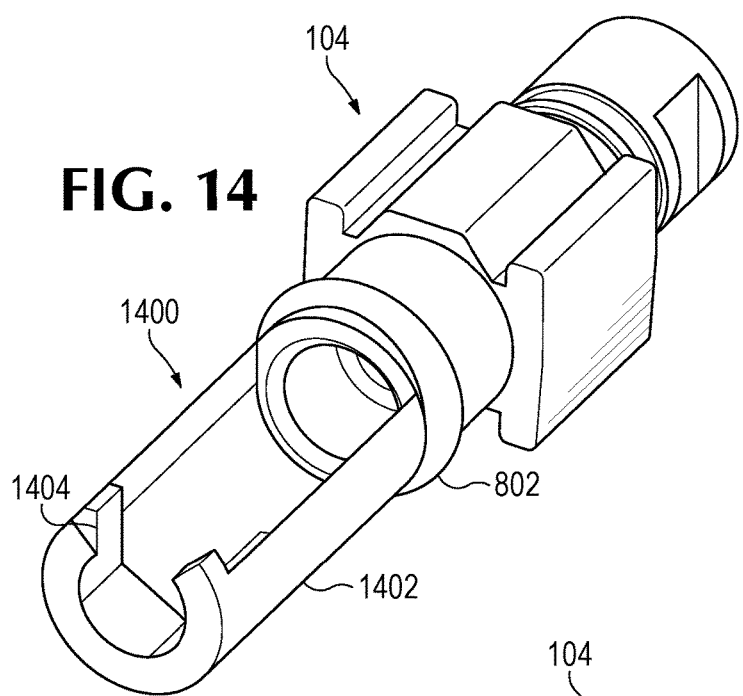
FIG. 14 illustrates a perspective view of another example back post of the assembly, wherein the back post includes an extension, in accordance with some embodiments.

FIG. 14 illustrates a perspective view of another example back post 104 of the assembly 100, wherein the back post 104 includes an extension 1400, in accordance with some embodiments. As shown, the extension 1400 comprises a holder in a shape of a cage 1402 configured as a keying element such as a partial hexagonal-shaped receptor 1404.

Figure 15:
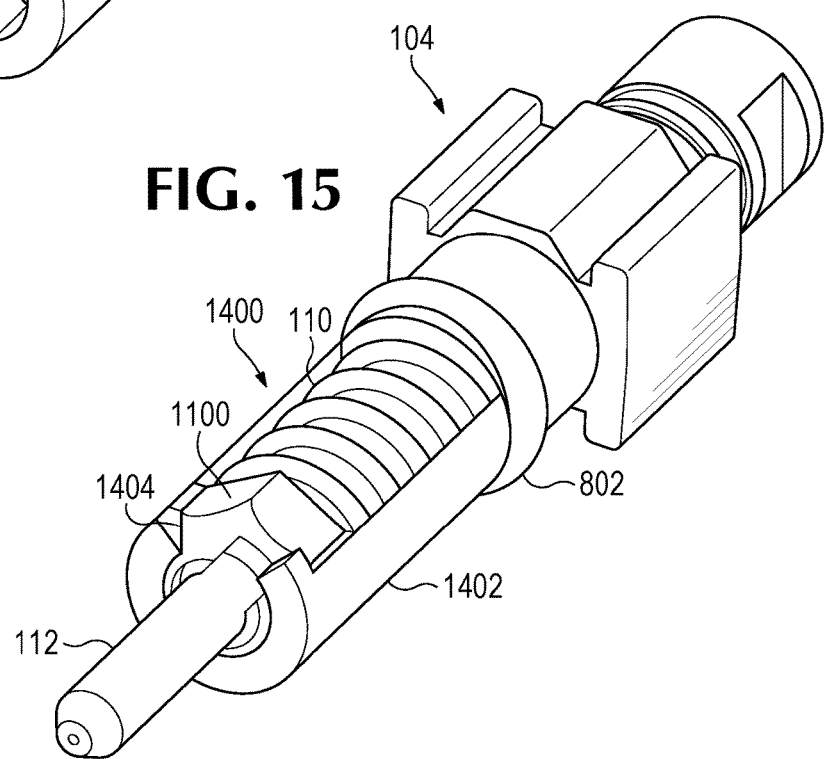
FIG. 15 illustrates a perspective view of a portion of the assembly with the back post of FIG. 14, in accordance with some embodiments.

FIG. 15 illustrates a perspective view of a portion of the assembly with the back post 104 of FIG. 14, in accordance with some embodiments. The extension 1400 may interface with, for example, at least a portion of the hexagonal shaped front face 1100 of the ferrule sleeve 114 to prevent the rotation of the ferrule 112, ferrule sleeve 114 and spring 110 of the assembly 100. In some embodiments, the cage 1402 assembly is a self-contained sub-assembly of the duplexed connector assembly because once ferrule 112, ferrule sleeve 114 and spring 110 are loaded into cage 1402, and no additional components are required to keep the assembly intact. The annular ring 802 of the back post 104 is also indicated in FIGS. 14-15.

Figure 16:
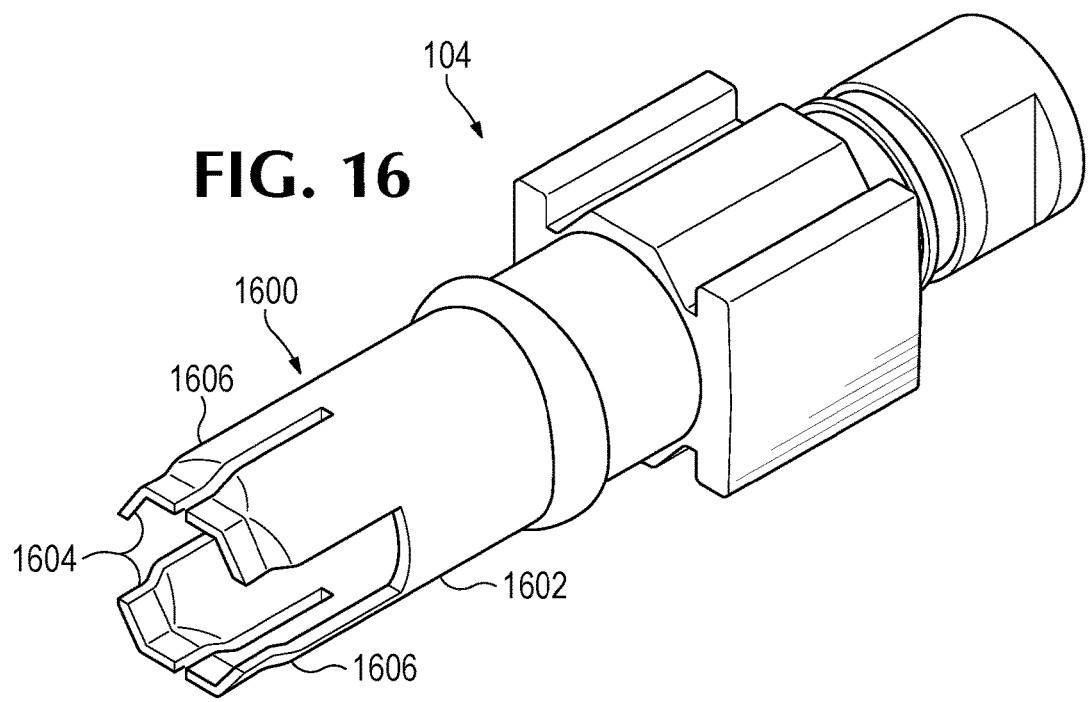
FIG. 16 illustrates a perspective view of another example back post of the assembly, wherein the back post includes an extension, in accordance with some embodiments.

FIG. 16 illustrates a perspective view of another example back post 104 of the assembly 100, wherein the back post 104 includes an extension 1600, in accordance with some embodiments. As shown, the extension 1600 comprises a substantially cylinder-shaped holder 1602 with a partial hexagonal-shaped ending 1604 configured as a keying element to interface with, for example, at least a portion of the hexagonal shaped front face 1100 of the ferrule sleeve 114 to prevent the rotation of the ferrule 112, ferrule sleeve 114 and spring 110 of the assembly 100 (these components are shown in FIGS. 1 and 11). As shown, the ending 1604 may include one of more fingers 1606 configured to retain the hexagonal shaped front face 1100 of the ferrule 112.

Figure 17:
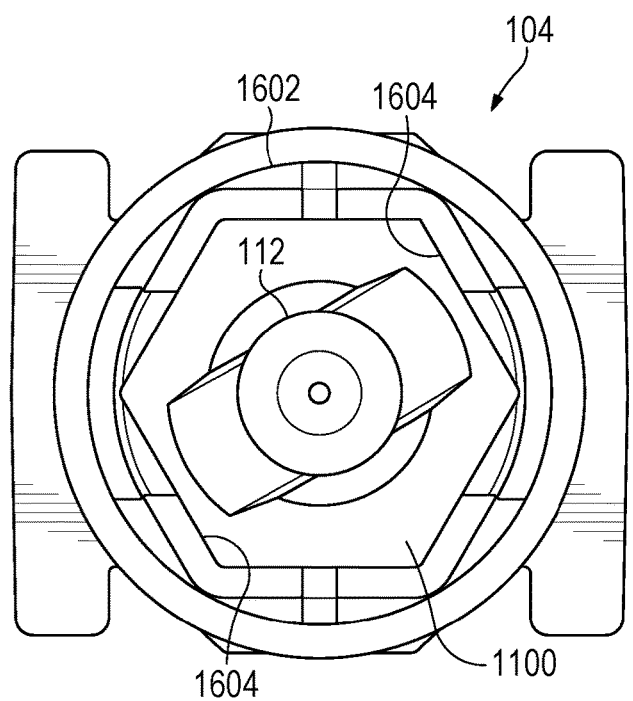
FIG. 17 further illustrates a front view of a portion of the example assembly, in a partially assembled state, in accordance with some embodiments.

FIG. 17 illustrates a front view of a portion of the example assembly 100, in a partially assembled state, in accordance with some embodiments. The front connector housing 120 corresponding to the ferrule 112 is not shown for ease of understanding of the application of the holder 1602. A shown, the holder 1602 may interface with and at least partially retain a hexagonally shaped portion (front face 1100) of the ferrule sleeve 114 with its receptor (partial hexagonal-shaped ending 1604), thus preventing the ferrule 112, ferrule sleeve 114 and spring 110 from rotation.

Figure 18:
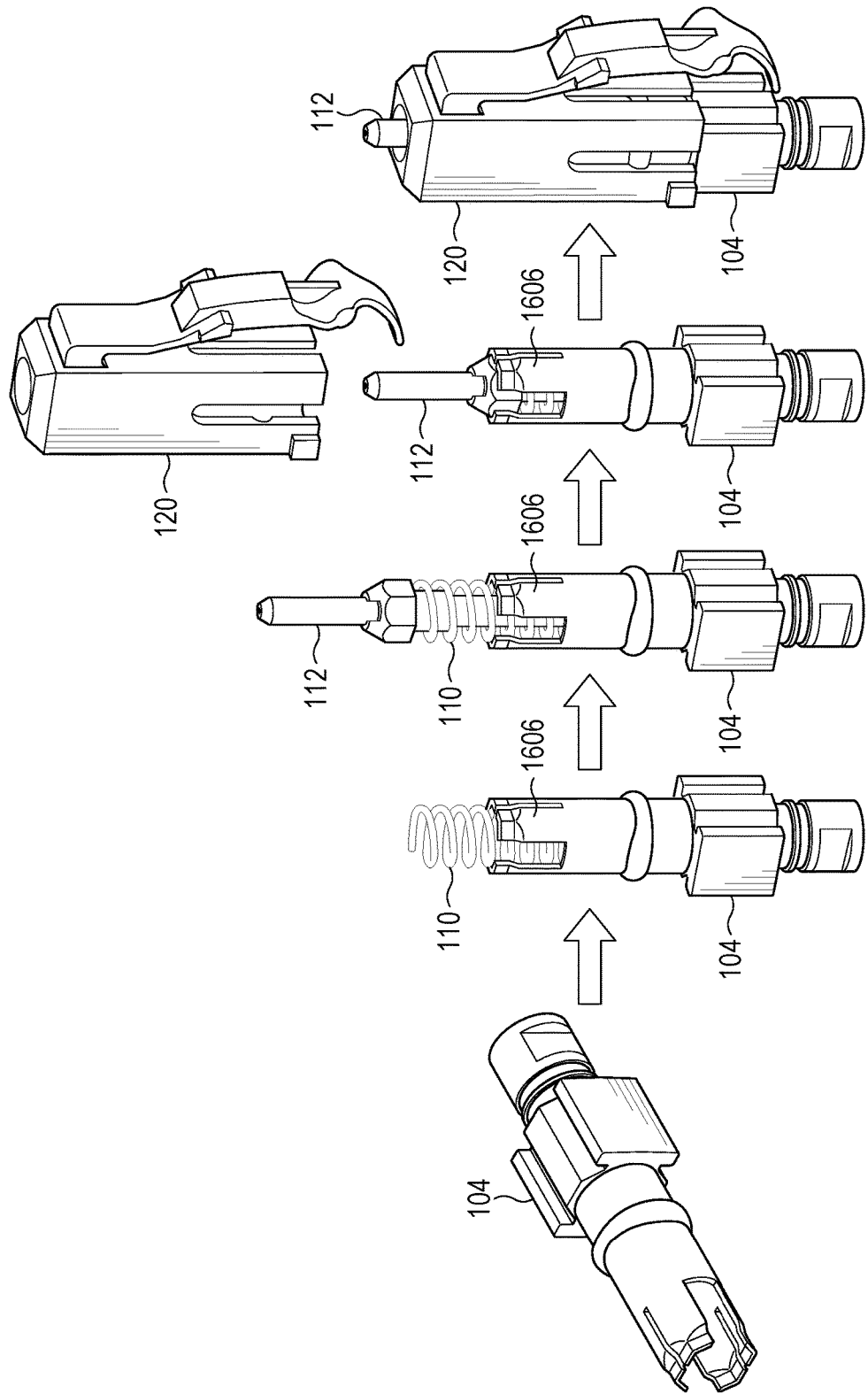
FIG. 18 illustrates an example process of a partial assembly of the simplex fiber optic connector assembly, in accordance with some embodiments.

FIG. 18 illustrates an example process of partial assembly of the simplex fiber optic connector assembly 100 (see FIG. 1) comprised of back post 104 with forward extending holder 1602 with fingers 1606 having annular ring 802 on the peripheral surface thereof, in accordance with some embodiments. As shown, the back post 104 includes the holder 1602 described in reference to FIGS. 16-17. The spring 110 may be forced inside the fingers 1606 of the holder 1602 prior to affixation of the front connector housing 120 to the holder 1602 of back post 104.

As described above with reference to FIG. 1, the housing 102 of the assembly 100 may comprise a unibody, or "uniboot," housing, configured to receive fiber optic cable (not shown) into a single, rearward cable channel and provide the separation of the two fibers of the cable into two portions, corresponding to connections "A" and "B" indicated on the housing 102, for a "one input-two outputs" configuration. In some embodiments, the housing 102 may comprise a shape (e.g., a duplexing clip) that may provide for two separate cable inputs and two corresponding outputs as described below.

Figure 19:
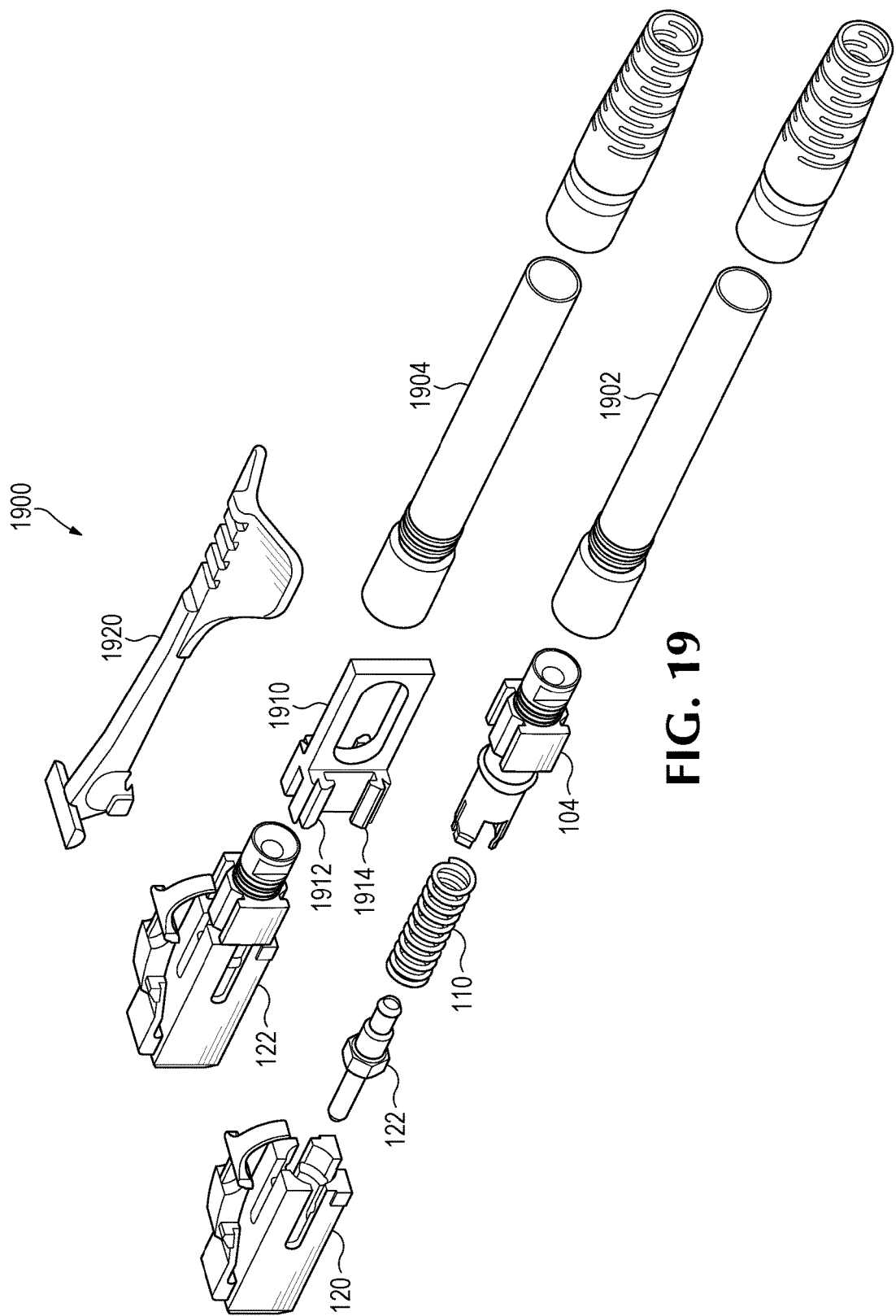
FIG. 19 illustrates an example embodiment of a duplex fiber optic connector assembly comprised of two simplex fiber optic connector assemblies coupled together in duplex fashion, in accordance with some embodiments.

FIG. 19 illustrates an example embodiment of a duplex fiber optic connector assembly 1900 comprised of two simplex fiber optic connector assemblies coupled together in duplex fashion by means of clip 1910 having hooks 1912, 1914 (and corresponding hooks on the opposing side of the clip 1910, not visible in FIG. 19), in accordance with some embodiments. Because assembly 1900 is comprised of two simplex fiber optic connector assemblies, assembly 1900 has two separate cable inputs 1902, 1904 coupled to the corresponding two separate back posts 104, 106 and two separate front connector housings 120, 122. For ease of understanding, the like components of assemblies 100 and 1900 are indicated by the same numerals.

The assembly 1900 may further include a puller 1920 configured to engage with connector latches 131, 132 (see FIG. 1) and which, upon pulling rearwardly in a horizontal plane, may cause the depression of connector latches 131, 132 to facilitate withdrawal and removal of front connector housings 120, 122 from engagement with another optical device (e.g., an adapter (not shown)) in order to keep the end face of ferrule 112 within front connector housings 120, 122 in a desired position for optimal optical connection with a matable connector.

Figure 20:
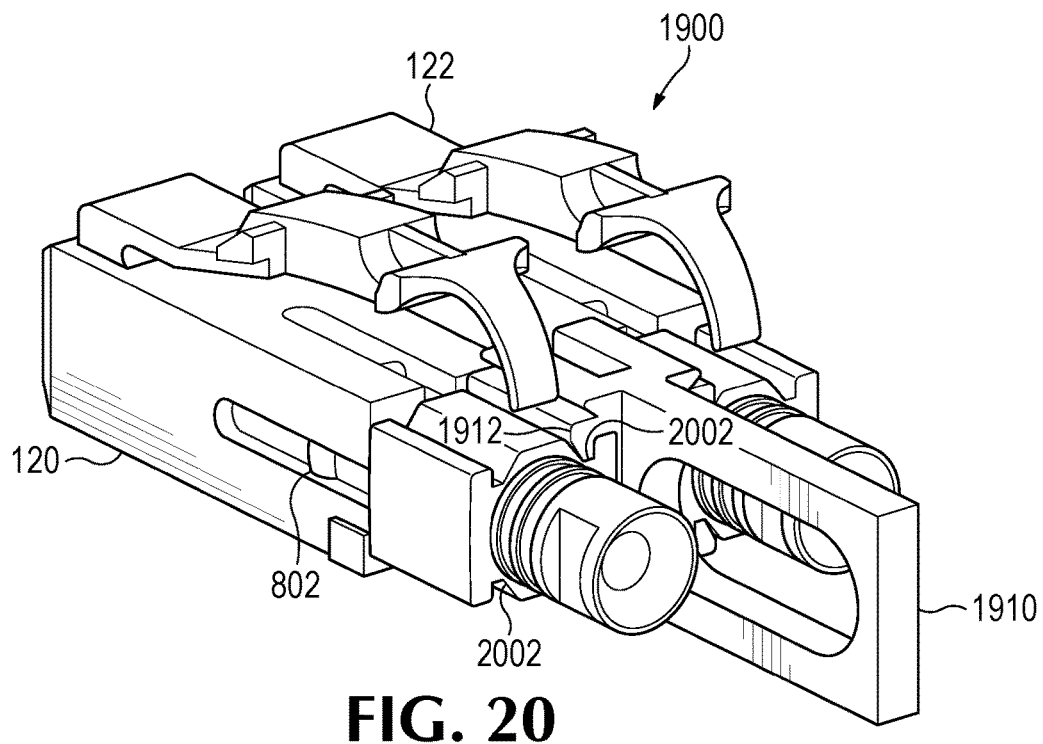
FIG. 20 illustrates the example fiber optic connector assembly in an assembled state, in accordance with some embodiments.

FIG. 20 illustrates the example fiber optic connector assembly 1900 in an assembled state, in accordance with some embodiments. The duplex clip 1910 may retain both back posts 104, 106 with hooks 1912, 1914 that may be inserted into corresponding grooves (e.g., 2002) of the back posts 104, 106. As may be seen, the back post 104 may include the same retaining component as one described in reference to FIG. 8. For example, the back post 104 may include annular ring 802 that may provide for seamless rotation of the front housing 120 relative to the back post 104, as well as coupling of the front housing 120 with the back post 104 during rotation of the front housing 120, as described in reference to FIGS. 8-9.

Accordingly, the assembly 1900 may provide for polarity reversal of the transmit and receive optical fibers of the circuit similarly to that of the assembly 100. For example, the front housings 120, 122 may be independently rotatable relative to their respective back posts 104, 106 (e.g., in opposing directions) until they reach their respective fully reversed positions, thus providing for polarity reversal, similar to the embodiments described in reference to FIGS. 6-7 for the unibody embodiment.

Figure 21:
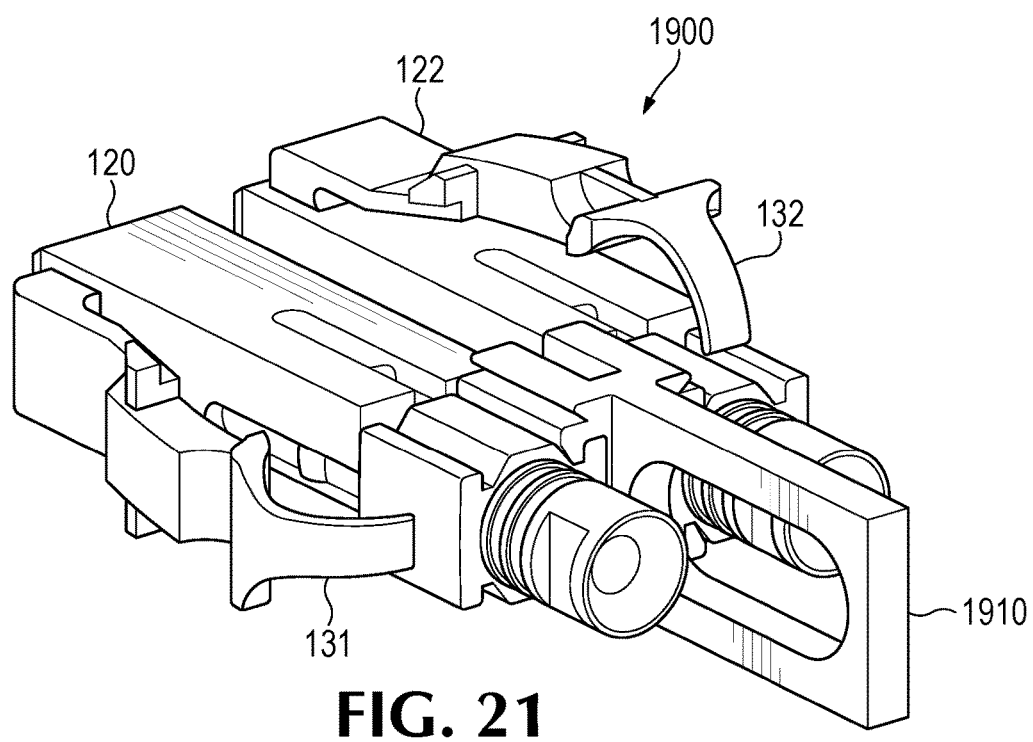
FIGS. 21-23 illustrate example embodiments of the assembly of FIG. 19, at partial rotation stage (FIG. 21) and completed rotation stage (FIGS. 22-23).
Figure 22:
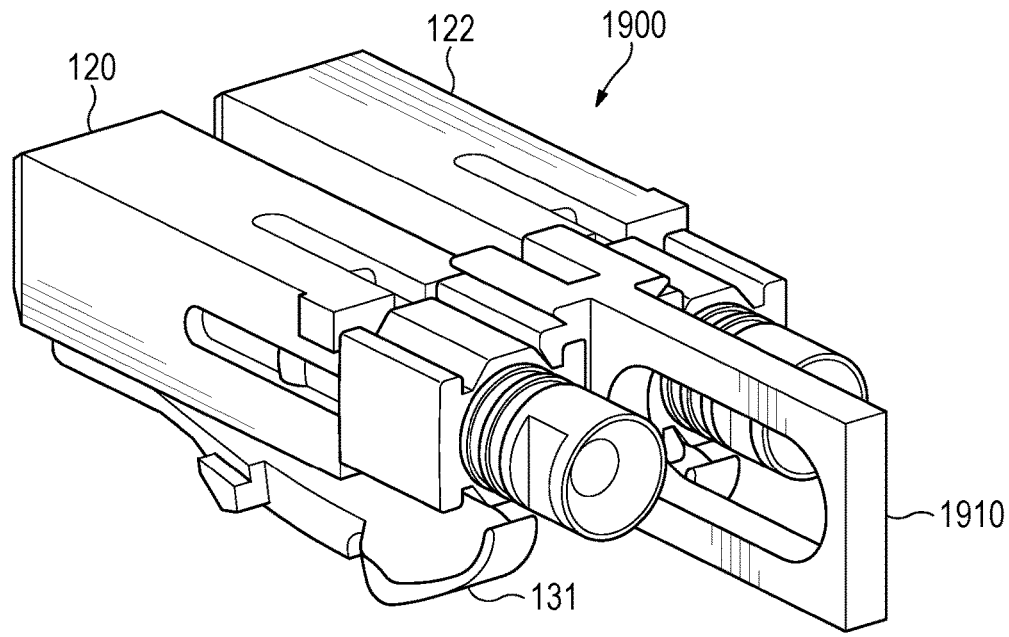
Figure 23:
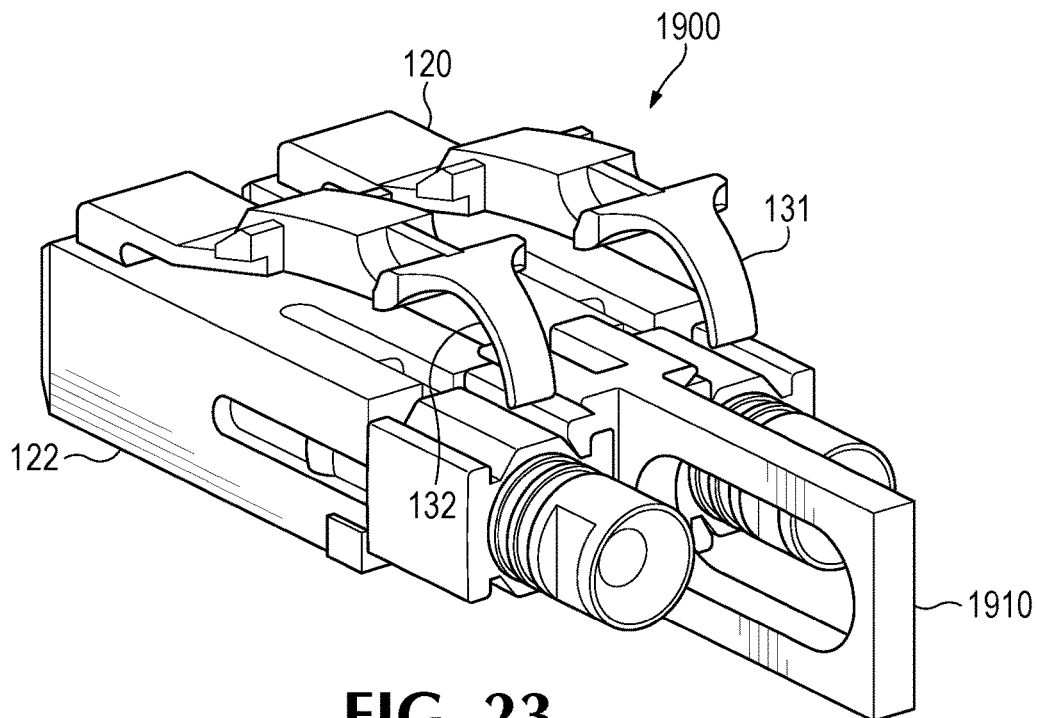

FIGS. 21-23 illustrate example embodiments of the assembly 1900, at partial rotation stage (FIG. 21) and completed rotation stage (FIGS. 22-23), in accordance with some embodiments. The front housing 120 is shown as partially rotated in FIG. 21, while FIG. 22 illustrates the assembly 1900 in which both front housings 120 and 122 reached their respective reversed positions, thus providing for polarity reversal, similar to the embodiment described in reference to FIG. 7. The assembly 1900 of FIG. 22 may be "flipped" as shown in FIG. 23 to position the connector housing surfaces upon which are disposed connector latches 131, 132 on the upward facing surfaces of the duplexed fiber optic connectors (comprising front housings 120, 122). As evident from FIG. 23, the front housing 120 ("B"), which used to be in the left side of the assembly 1900 of FIG. 22, is now located on the right side of the assembly 1900 of FIG. 23. Similarly, the front housing 122 ("A"), which used to be in the right side of the assembly 1900 of FIG. 22, is now located on the left side of the assembly 1900 of FIG. 23. Accordingly, the polarity of the transmit and receive optical fibers of assembly 1900 have been reversed.

Figure 24:
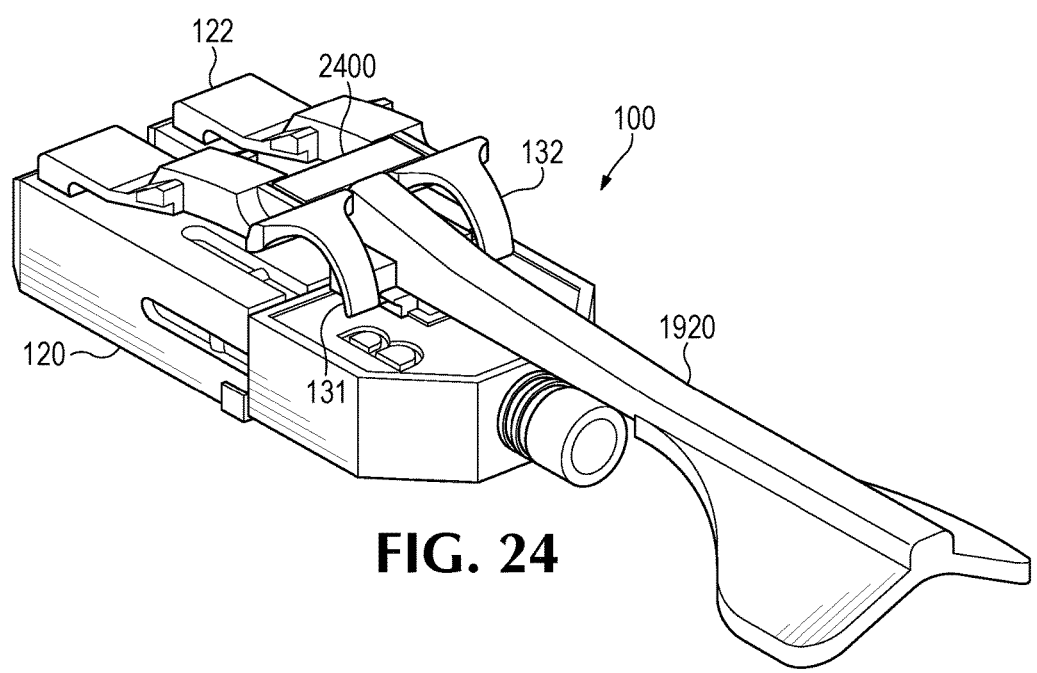
FIG. 24 illustrates an example assembly including the puller of FIG. 19, in accordance with some embodiments.

FIG. 24 illustrates an example assembly 100 including the puller 1920 in accordance with some embodiments. As shown, the puller 1920 may include a hammer head element 2400 having opposing lateral extensions at the forward end of puller 1920, to engage the latches 131, 132 of the front connector housings 120 and 122. Connector latches 131, 132 (see, e.g., FIG. 1) may be depressed, in a downwardly direction, upon the downward, sliding engagement of the lateral extensions of hammer head 2400 of puller 1920 with latches 131, 132 when puller 1920 is pulled rearward. The depression of connector latches 131, 132 facilities the removal of the duplexed connector assembly from mating connectors (e.g., an adapter (not shown)).

Figure 24A:
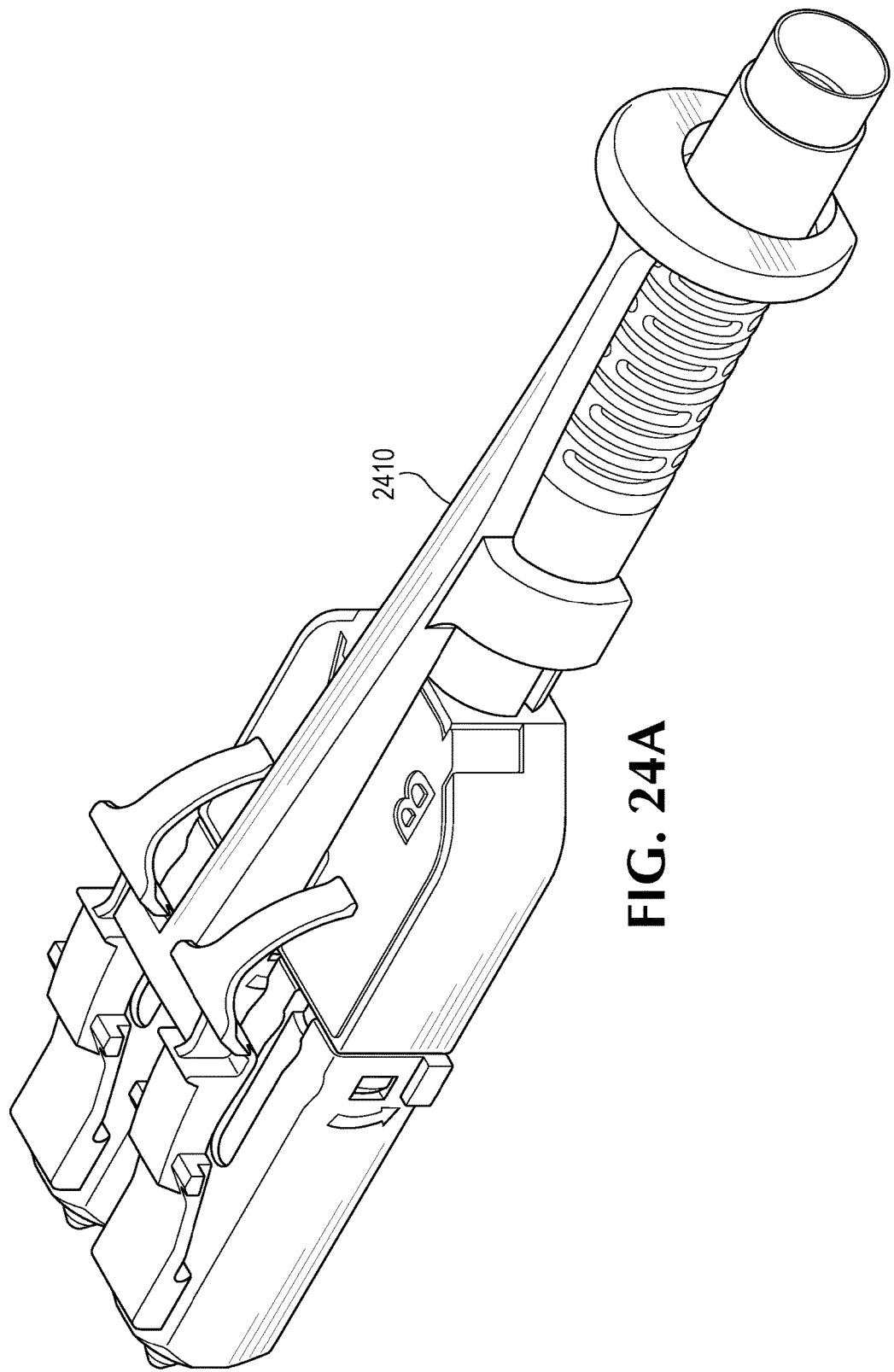
FIGS. 24A-B illustrate another example assembly with a puller, in accordance with some embodiments.
Figure 24B:
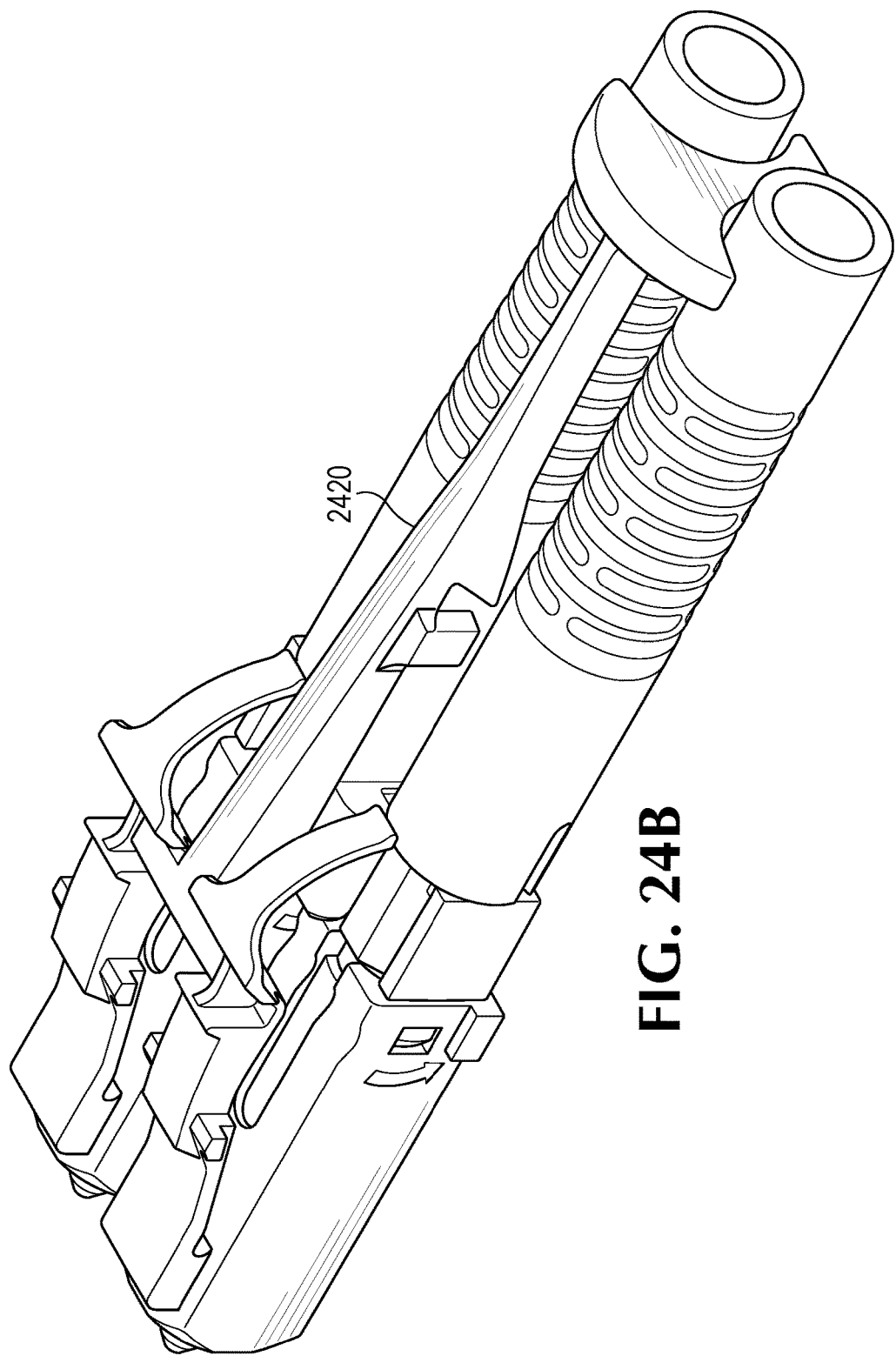
Figure 25:
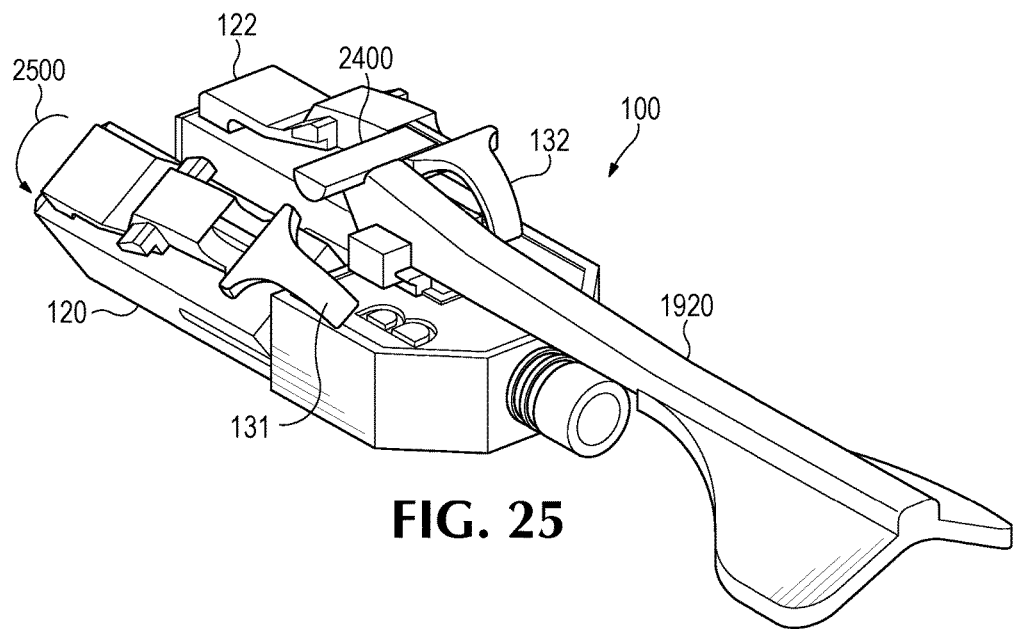
FIGS. 25-28 illustrate the steps in polarity reversal of a fiber optic connector in the assembly, in accordance with some embodiments.
Figure 26:
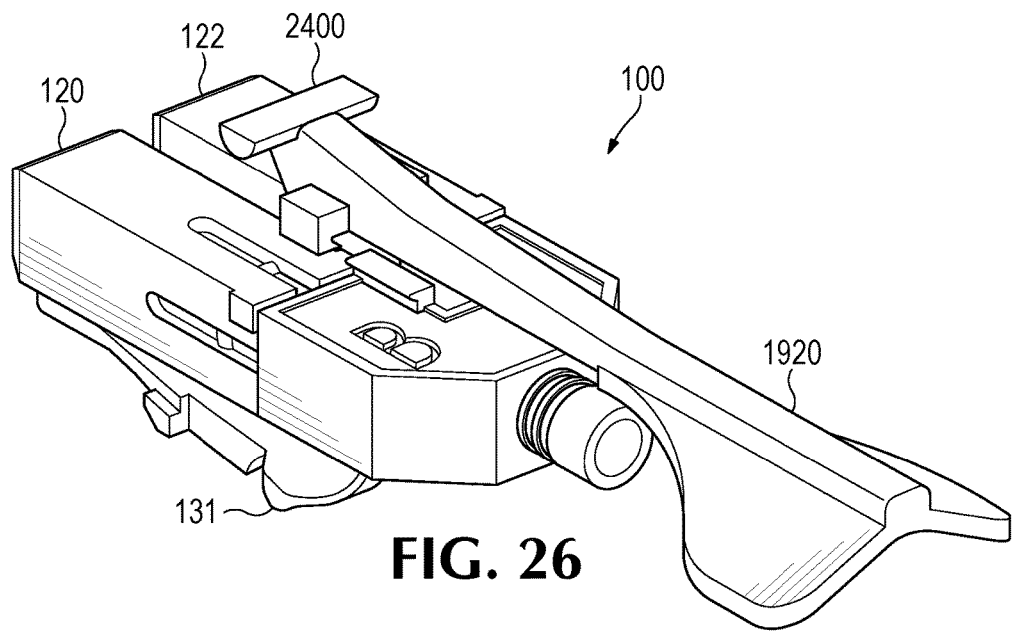
Figure 27:
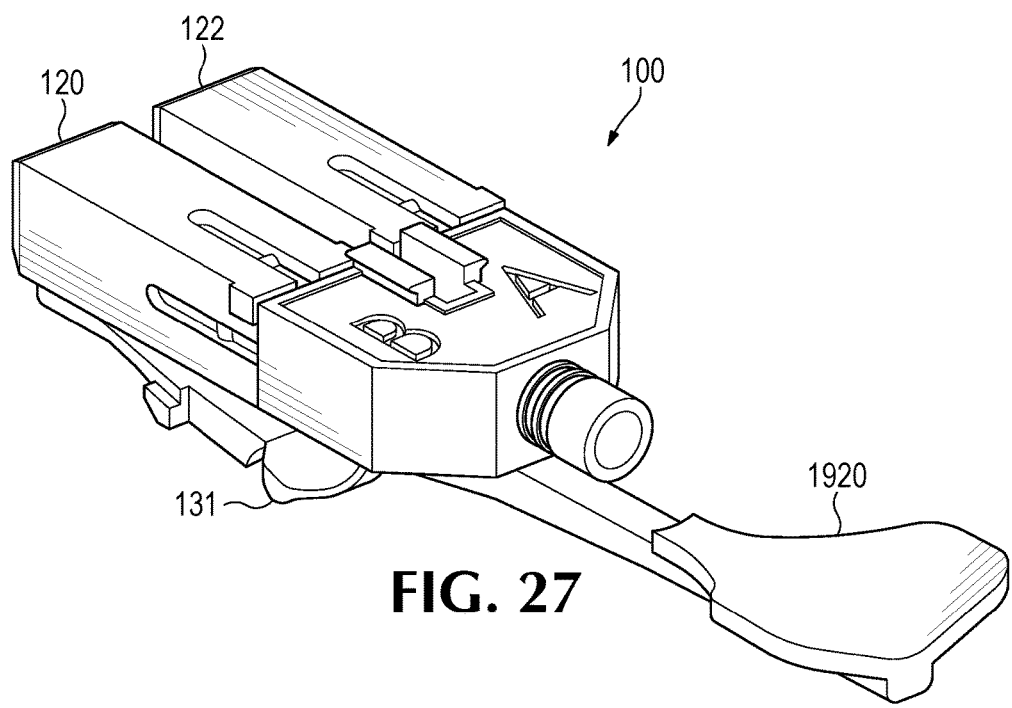
Figure 28:
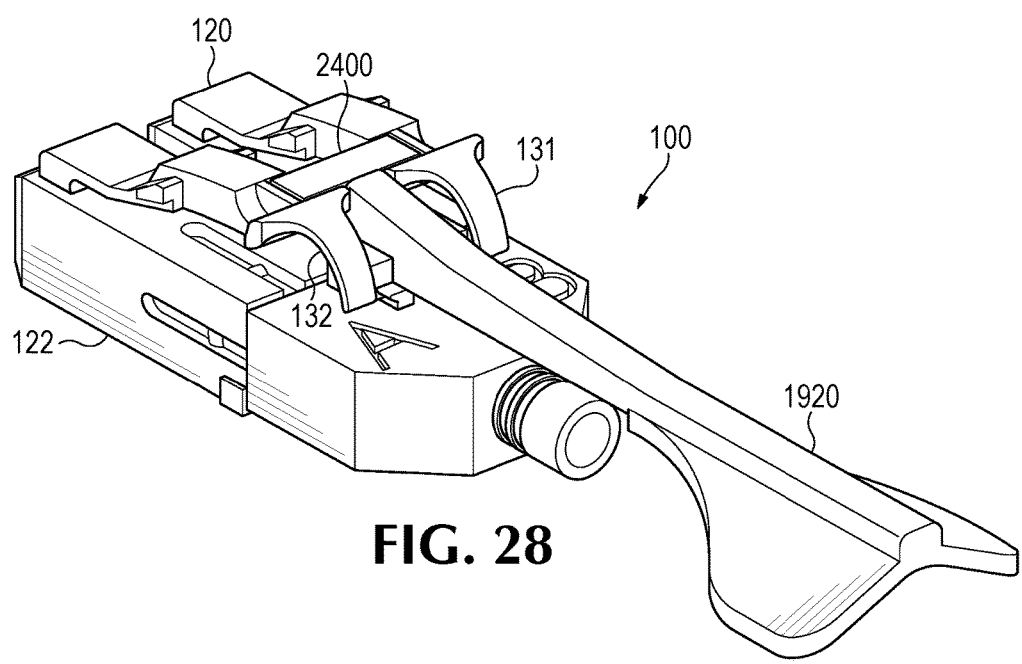

FIGS. 24A-B illustrate another example assembly with a puller, in accordance with some embodiments. FIG. 24A illustrates a perspective view of the unibody embodiment of the example assembly with a puller 2410, and FIG. 24B illustrates a perspective view of the duplex embodiment of the example assembly with a puller 2420. The unibody and duplex puller embodiments are variations on the rear "touch point" of the puller where the user may grab and pull to release the connector from a fiber adaptor. Both embodiments are intended to be low profile and resist snagging on adjacent fiber cables when removed from a high density fiber patching array. There are two embodiments because the puller may interface with a single cable in the case of the unibody embodiment (FIG. 24A), and may interface with TWO cables (zipcord) in the duplex embodiment (FIG. 24B).

FIGS. 25-28 illustrate, in sequential order, the steps in polarity reversal of fiber optic connector "B" (e.g., left side of duplex, front housing 120) vis-à-vis fiber optic connector "A" (e.g., right side of duplex, front housing 122). The steps may be the same in both the unibody housing 102 and the duplex clip 1910 configurations. Accordingly, FIGS. 25-28 illustrate a unibody housing 102 embodiment, and FIGS. 19-23 illustrate a clip 1910 embodiment.

In both cases, polarity reversal is started with the initial counterclockwise rotation 2500 of fiber optic connector "B" with the rearward directed free end of its latch 131 sliding out from under the lateral projection of hammer head 2400 of puller 1920. Likewise, initiation of the clockwise rotation of fiber optic connector "A" causes the rearward directed free end of its latch 132 to slide out from under the opposing lateral projection from the hammer head 2400 of puller 1920. Once both fiber optic connectors "B" and "A" are partially or fully rotated 180° in opposite directions, puller 1920 may be disengaged from the duplexed fiber optic connector assembly 100, 1900 and re-engaged to the opposing side of the duplexed fiber optic connector assembly 100, 1900. The resultant fiber optic connector assembly 100, 1900 will now have fiber optic connector "B" on the opposite side of fiber optic connector "A," i.e., the polarity of the transmit and receive optical fibers in fiber optic connectors "B" and "A" is reversed from the original configuration.

What is claimed is:

1. A fiber optic connector assembly, comprising:
    a housing configured to receive a fiber optic cable via a first end, wherein the housing comprises a cylindrical back post that extends from a second end of the housing, the cylindrical back post is configured to receive and hold a ferrule, and the cylindrical back post comprises an engagement feature that traverses a circumference of the cylindrical back post; and
    a front housing configured to fit over the cylindrical back post, to engage with the engagement feature, and to allow a portion of the ferrule to protrude through a front of the front housing while coupled to the cylindrical back post,
    wherein the front housing is rotatable about the cylindrical back post independently of the ferrule.

2. The fiber optic connector assembly of claim 1, wherein the cylindrical back post is a continuous extension of the housing.

3. The fiber optic connector assembly of claim 1, wherein the cylindrical back post comprises a lug configured to hold the front housing on the cylindrical back post, and wherein the front housing comprises a window mateable with the lug.

4. The fiber optic connector assembly of claim 3, wherein the front housing further comprises at least one slit disposed at least partially along a side of the front housing.

5. The fiber optic connector assembly of claim 1, further comprising a spring configured to reside inside the cylindrical back post and to receive an end of the ferrule, wherein an end of the spring abuts an end of the cylindrical back post while installed inside the cylindrical back post.

6. The fiber optic connector assembly of claim 1, wherein the engagement feature is an annular ring, and wherein the front housing is configured to engage with the annular ring in response to application of a pressing force to the front housing in a direction of the cylindrical back post.

7. The fiber optic connector assembly of claim 6, wherein an inner profile of the front housing comprises a groove mateable with the annular ring, and wherein the annular ring is configured to interact with the groove to guide a rotation of the front housing about the cylindrical back post.

8. The fiber optic connector assembly of claim 7, wherein the cylindrical back post comprises an extension component configured to retain the ferrule and to prevent rotation of the ferrule during the rotation of the front housing.

9. The fiber optic connector assembly of claim 2, wherein the cylindrical back post is a first cylindrical back post, the ferrule is a first ferrule, the engagement feature is a first engagement feature, and the front housing is a first front housing, and the fiber optic connector assembly further comprises:
    a second cylindrical back post that extends from the second end of the housing, wherein the second cylindrical back post is configured to receive and hold a second ferrule, and the second cylindrical back post comprises a second engagement feature that traverses a circumference of the second cylindrical back post; and
    a second front housing configured to fit over the second cylindrical back post, to engage with the second engagement feature, and to allow a portion of the second ferrule to protrude through a front of the second front housing while coupled to the second cylindrical back post, wherein the second front housing is rotatable about the second cylindrical back post independently of the second ferrule.

10. The fiber optic connector assembly of claim 9, wherein the second cylindrical back post is a continuous extension of the housing.

11. The fiber optic connector assembly of claim 10, wherein the housing comprises a unibody housing.

12. The fiber optic connector assembly of claim 9, further comprising a duplex clip comprising first and second retaining components configured to affixably retain the first cylindrical back post and the second cylindrical back post, respectively.

13. The fiber optic connector assembly of claim 12, wherein the first retaining component comprises first and second hooks, and the second retaining component comprises third and fourth hooks.

14. The fiber optic connector assembly of claim 12, wherein the first cylindrical back post and the second cylindrical back post are configured to receive a first fiber of the fiber optic cable and a second fiber of the fiber optic cable, respectively.

15. The fiber optic connector assembly of claim 1, wherein the cylindrical back post comprises a keying element configured to engage with a corresponding key disposed on the ferrule.

16. The fiber optic connector assembly of claim 1, wherein the cylindrical back post is reversibly couplable with the housing.

17. The fiber optic connector assembly of claim 1, wherein the engagement feature is a step feature.

18. The fiber optic connector of claim 17, wherein the cylindrical back post further comprises a lug that interacts with the front housing to locate the front housing at one or more angular positions about the cylindrical back post.

19. The fiber optic connector assembly of claim 1, wherein the front housing comprises a connector latch that mechanically latches the fiber optic connector assembly to an optical adapter.

20. The fiber optic connector assembly of claim 19, further comprising a puller comprising a hammer head element with opposing lateral extensions, wherein one of the opposing lateral extensions is configured to engage with the latch.

* * * * *